(12) United States Patent
Li

(10) Patent No.: US 12,569,765 B2
(45) Date of Patent: Mar. 10, 2026

(54) INTERACTION METHOD AND RELATED APPARATUS

(71) Applicant: Tencent Technology (Shenzhen) Company Limited, Shenzhen (CN)

(72) Inventor: Yu Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 317 days.

(21) Appl. No.: 18/206,928

(22) Filed: Jun. 7, 2023

(65) Prior Publication Data

US 2023/0310994 A1 Oct. 5, 2023

Related U.S. Application Data

(63) Continuation of application No. PCT/CN2022/099057, filed on Jun. 16, 2022.

(30) Foreign Application Priority Data

Jul. 14, 2021 (CN) .......................... 202110797684.2

(51) Int. Cl.
| | |
|---|---|
| A63F 13/52 | (2014.01) |
| A63F 13/42 | (2014.01) |
| A63F 13/55 | (2014.01) |
| A63F 13/86 | (2014.01) |
| A63F 13/87 | (2014.01) |

(52) U.S. Cl.
CPC .............. *A63F 13/55* (2014.09); *A63F 13/42* (2014.09); *A63F 13/52* (2014.09); *A63F 13/86* (2014.09); *A63F 13/87* (2014.09)

(58) Field of Classification Search
None
See application file for complete search history.

(56) References Cited

U.S. PATENT DOCUMENTS

| | | | | |
|---|---|---|---|---|
| 2017/0157512 A1* | 6/2017 | Long | .......................... | A63F 13/86 |
| 2019/0118086 A1* | 4/2019 | Gentile | .................. | A63F 13/25 |

FOREIGN PATENT DOCUMENTS

| | | |
|---|---|---|
| CN | 110213601 A | 9/2019 |
| CN | 112423002 A | 2/2021 |
| CN | 112689154 A | 4/2021 |

(Continued)

OTHER PUBLICATIONS

International Search Report and Written Opinion received for PCT Patent Application No. PCT/CN2022/099057, mailed on Sep. 14, 2022, 19 pages (8 pages of English Translation and 11 pages of Original Document).

(Continued)

*Primary Examiner* — Damon J Pierce
(74) *Attorney, Agent, or Firm* — ARENTFOX SCHIFF LLP

(57) ABSTRACT

An interaction method is provided. In the method, a first virtual object is controlled to perform an action in a virtual environment based on a user input. Livestreaming permission information is received based on the action satisfying a livestreaming condition. The livestreaming permission information indicates that the first virtual object is permitted to livestream in the virtual environment. Livestreaming content to live stream in the virtual environment is determined based on the livestreaming permission information.

15 Claims, 13 Drawing Sheets

(56)                References Cited

FOREIGN PATENT DOCUMENTS

| CN | 112973120 | A | 6/2021 |
|----|-----------|---|--------|
| CN | 113440840 | A | 9/2021 |

OTHER PUBLICATIONS

Office Action received for Chinese Patent Application No. 202110797684.2, mailed on Jul. 14, 2022, 13 pages (5 pages of English Translation and 8 pages of Original Document).

\* cited by examiner

Display apparatus

Livestreaming
display position

Livestreaming
content

Approach

Reward interface

Virtual item transfer record

Interaction apparatus 1400

1401

First obtaining unit

1402

First determining unit

1403

Second obtaining unit

1404

First transmitting unit

710 — RF circuit

770 — WiFi module

790 — Power supply

780 — Processor

760 — Audio circuit

Loudspeaker 761

Microphone 762

720 — Memory

750 — Sensor

730 — Input unit

731

Touch panel

Other input devices

732

Display unit

740

Display panel

741

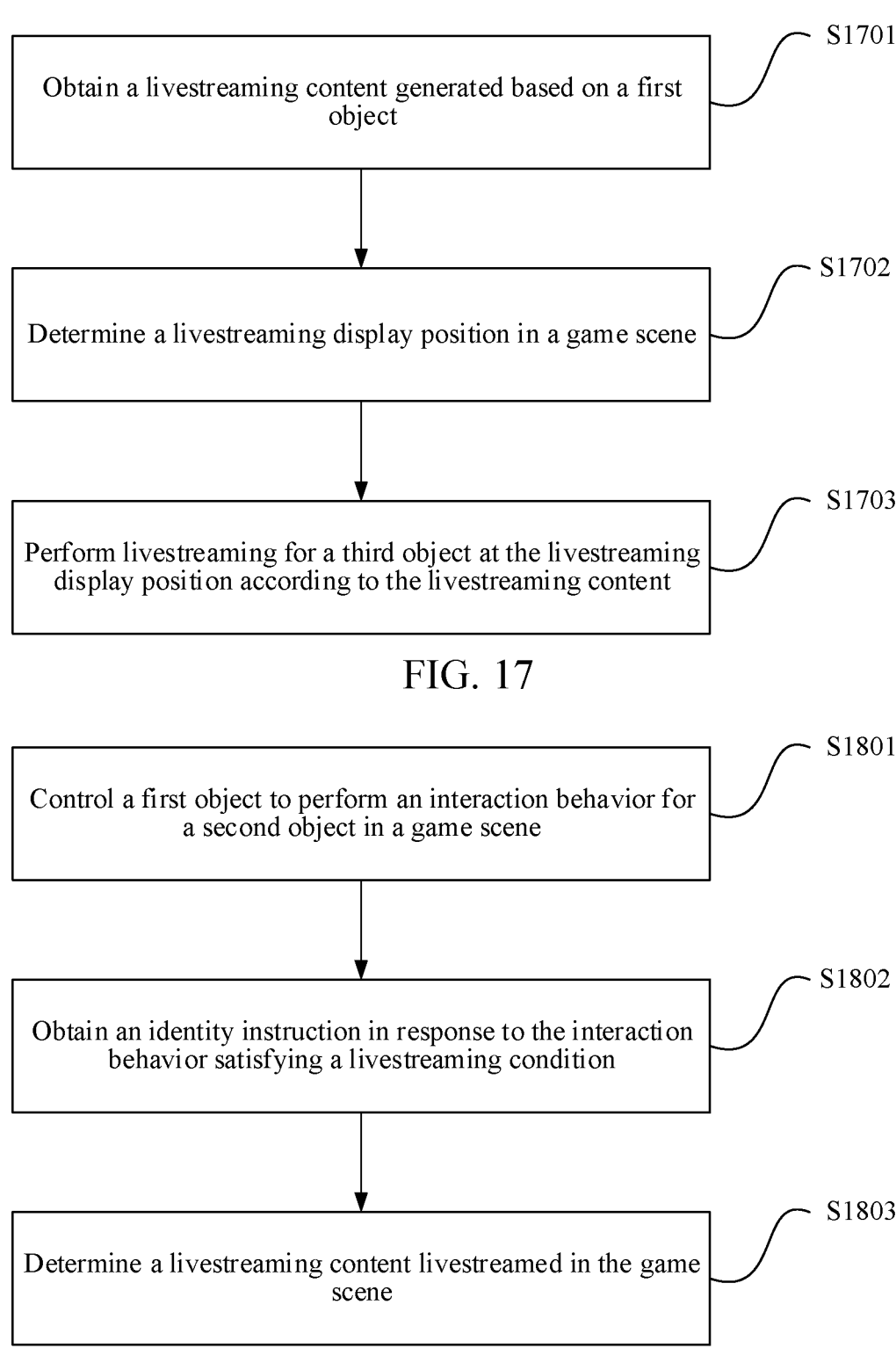

Obtain a livestreaming content generated based on a first object                    S1701

Determine a livestreaming display position in a game scene                    S1702

Perform livestreaming for a third object at the livestreaming display position according to the livestreaming content                    S1703

FIG. 17

Control a first object to perform an interaction behavior for a second object in a game scene                    S1801

Obtain an identity instruction in response to the interaction behavior satisfying a livestreaming condition                    S1802

Determine a livestreaming content livestreamed in the game scene                    S1803

FIG. 18

INTERACTION METHOD AND RELATED APPARATUS

RELATED APPLICATIONS

This application is a continuation of International Application No. PCT/CN2022/099057, filed on Jun. 16, 2022, and entitled "INTERACTION METHOD AND RELATED APPARATUS," which claims priority to Chinese Patent Application No. 202110797684.2, filed on Jul. 14, 2021, and entitled "INTERACTION METHOD AND RELATED APPARATUS." The entire disclosures of the prior applications are hereby incorporated by reference in their entirety.

FIELD OF THE TECHNOLOGY

This application relates to the technical field of gaming, including a game interaction.

BACKGROUND OF THE DISCLOSURE

As game development technologies continue to improve and game types continue to enrich the player experience, players are increasingly demanding improved game experiences. Game interaction in which players may participate in a game is a major factor affecting the game experiences of the players.

In the related art, an interaction manner in the game mainly depends on the game types. For example, the interaction manner in a shooting game is mainly shooting between players, and the like. The interaction manner is relatively simple, and therefore it is difficult to further improve the game experiences of the players.

SUMMARY

In order to solve the foregoing technical problem, this disclosure provides an interaction method, which provides for example a new player-dominated livestreaming interaction manner for players, so as to increase the diversity of interaction in a game and improve the game experiences of the players.

Embodiments of this disclosure include the following technical solutions.

According to an aspect, an interaction method is provided. The method is performed by a terminal device for example. In the method, a first virtual object is controlled to perform an action in a virtual environment based on a user input. Livestreaming permission information is received based on the action satisfying a livestreaming condition. The livestreaming permission information indicates that the first virtual object is permitted to livestream in the virtual environment. Livestreaming content to live stream in the virtual environment is determined based on the livestreaming permission information.

According to another aspect, an interaction apparatus is provided. The interaction apparatus includes processing circuitry that is configured to control a first virtual object to perform an action in a virtual environment based on a user input. The processing circuitry is configured to receive livestreaming permission information based on the action satisfying a livestreaming condition. The livestreaming permission information indicates that the first virtual object is permitted to livestream in the virtual environment. Further, the processing circuitry is configured to determine livestreaming content to live stream in the virtual environment based on the livestreaming permission information.

According to another aspect, an interaction method is provided. The method is performed by a server for example. In the method, an action that is performed by a first virtual object in a virtual environment based on a user input is determined. A determination is made that the first virtual object is permitted to live stream in the virtual environment when the action satisfies a livestreaming condition. Livestreaming content of the first virtual object to live stream in the virtual environment is obtained. Further, the livestreaming content is transmitted to a terminal device of a second virtual object in the virtual environment According to another aspect, an interaction apparatus is provided. The interaction apparatus includes processing circuitry that is configured to determine an action that is performed by a first virtual object in a virtual environment based on a user input. The processing circuitry is configured to determine that the first virtual object is permitted to live stream in the virtual environment when the action satisfies a livestreaming condition. The processing circuitry is configured to obtain livestreaming content of the first virtual object to live stream in the virtual environment. Further, the processing circuitry is configured to transmit the livestreaming content to a terminal device of a second virtual object in the virtual environment.

According to another aspect, an interaction method is provided. The method is performed by a terminal device for example. In the method, livestreaming content of a first virtual object is received. The first virtual object is a livestreamer in a virtual environment. The virtual environment includes the first virtual object and a second virtual object. A livestreaming display position in the virtual environment is determined. The livestreaming content of the first virtual object is displayed at the livestreaming display position according to a positional relationship between an object position of the second virtual object and the livestreaming display position in the virtual environment.

According to another aspect, an interaction apparatus is provided. The interaction apparatus includes processing circuitry that is configured to receive livestreaming content of a first virtual object. The first virtual object is a livestreamer in a virtual environment. The virtual environment includes the first virtual object and a second virtual object. The processing circuitry is configured to determine a livestreaming display position in the virtual environment. The processing circuitry is configured to display the livestreaming content of the first virtual object at the livestreaming display position according to a positional relationship between an object position of the second virtual object and the livestreaming display position in the virtual environment.

According to still another aspect, an embodiment of this disclosure discloses an interaction system. The system includes a first terminal device, a second terminal device, and a server.

The first terminal device is configured to perform the interaction method performed by a first terminal device in the above aspects.

The second terminal device is configured to perform the interaction method performed by a second terminal device in the above aspects.

The server is configured to perform the interaction method performed by the server in the above aspects.

According to yet another aspect, an embodiment of this disclosure discloses a computer device. The device includes a processor and a memory.

The memory is configured to store a program code and transmit the program code to the processor.

The processor is configured to perform any of the interaction methods in the above aspects according to an instruction in the program code.

According to yet another aspect, an embodiment of this disclosure discloses a non-transitory computer-readable storage medium storing instructions which when executed by a processor cause the processor to perform any of the interaction methods in the above aspects.

According to yet another aspect, an embodiment of this disclosure provides a computer program product including instructions that, when run on a computer, enable the computer to perform any of the interaction methods in the above aspects.

For example, it can be seen from the foregoing technical solution that in order to improve the richness of an interaction manner in a game, a first object may be controlled to perform an interaction behavior for livestreaming in a game scene. In response to the interaction behavior satisfying a livestreaming condition, an identity instruction for indicating that the first object is a livestreamer in the game scene is obtained. Thus, a player may serve as the livestreamer to determine a livestreaming content by controlling the first object in the game. The livestreaming content may be livestreamed to other player objects in the game scene at a livestreaming display position. By organically integrating the livestreaming manner into the game, a new player-dominated interaction manner for performing livestreaming interaction between the player objects in the game scene is realized. Therefore, the interaction manner in the game is not limited by the type of the game, thereby further enriching the diversity of play methods in the game and improving the interaction experience of the player in the game. Moreover, the player may experience livestreaming as the livestreamer by only controlling the player object. Therefore, the livestreaming experience threshold in the game scene is lower than that in the related art in which livestreaming authentication is required and applications are additionally installed.

BRIEF DESCRIPTION OF THE DRAWINGS

FIG. 17 is a flowchart of an interaction method according to an embodiment of this disclosure.

FIG. 18 is a flowchart of an interaction method according to an embodiment of this disclosure.

DESCRIPTION OF EMBODIMENTS

The following describes embodiments of this disclosure with reference to the accompanying drawings.

To improve game experiences of players, improvement of the playability and richness of interaction manners in games has been an important issue for game technicians. In the related art, the interaction manners in the games are mainly limited by game types. Therefore, the interaction manners in the games of the same type are basically consistent, and may reduce the game interest of the players and bring poor game experiences to the players. Even if some interaction manners that are different from the game types are added to the games, it is difficult for the player to become a dominant player of the interaction due to these interaction manners. For example, in the related art, a pre-recorded video may be played in a shooting game, and a player can neither determine the time for video playing, nor dominate the video playing content, thereby reducing the degree of participation.

In order to solve the foregoing technical problem, an embodiment of this disclosure provides an interaction method. A player may obtain a livestreamer identity by controlling a player object in a game so as to obtain a permission of determining a livestreaming content. Thus, by combining a livestreaming interaction manner with a game scene, a new player-dominated in-game livestreaming interaction manner is provided for the player, thereby increasing the diversity of game interaction and improving the game experience of the player.

It may be understood that the method may be applied to a processing device. The processing device is a processing device capable of controlling interaction in a game, such as a terminal device and a server having an interaction control function. The method may be applied to a network scene in which the terminal device communicates with the server, and is performed cooperatively by the terminal device and the server. The terminal device may be a computer, a mobile phone, or another device. The server may be understood to be an application server or a Web server. In actual deployment, the server may be an independent server or a cluster server.

For ease of understanding the technical solutions provided in the embodiments of this disclosure, the interaction method in the embodiments of this disclosure is described below with reference to an actual application scene.

Figure 1:
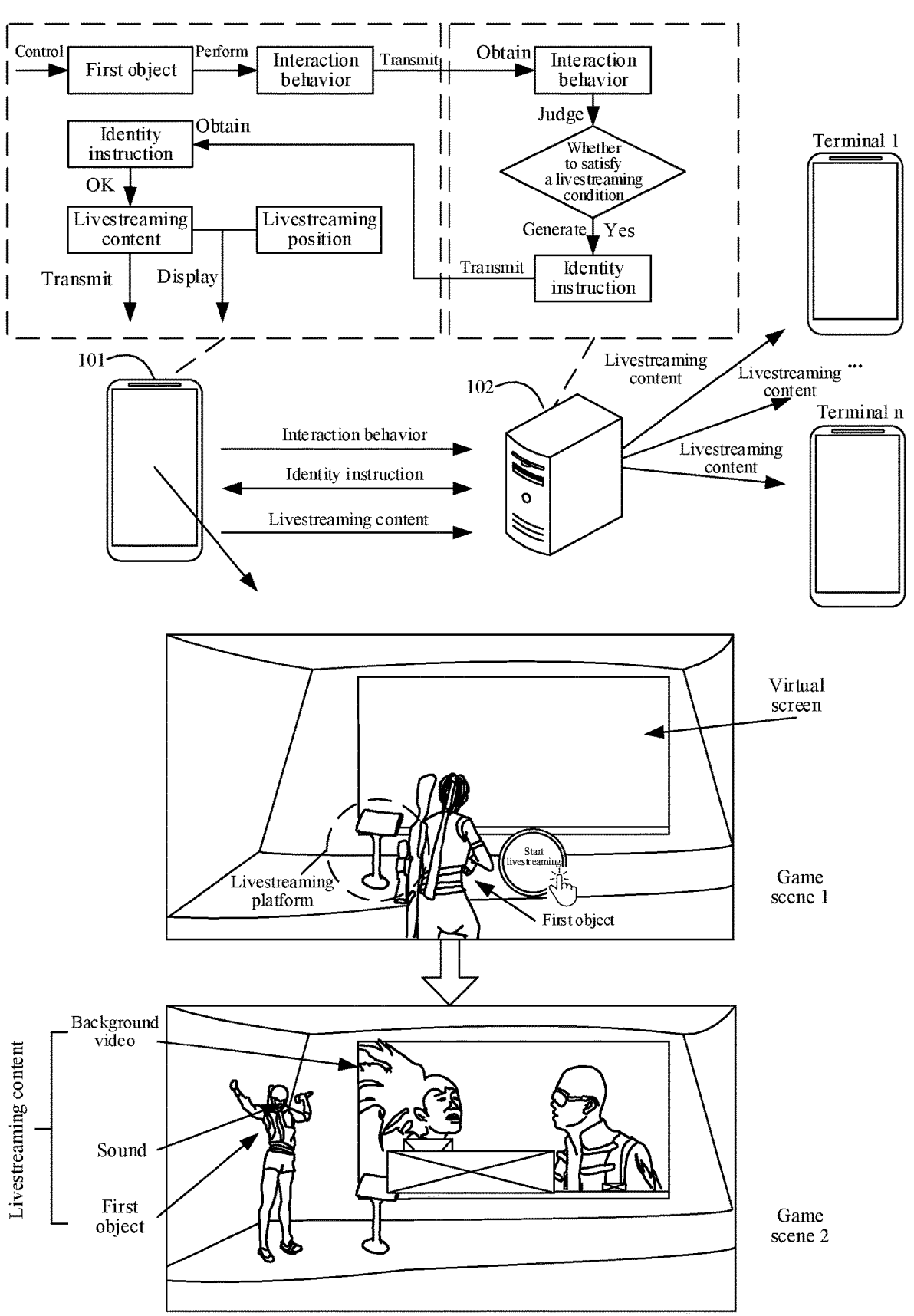
FIG. 1 is a schematic diagram of an interaction method in an actual application scene according to an embodiment of this disclosure.

Referring to FIG. 1, FIG. 1 is a schematic diagram of an interaction method in an actual application scene according to an embodiment of this disclosure. In this actual application scene, the processing device is a terminal device 101 and a server 102. A game as shown in the figure is run in the terminal device 101. The server 102 is a game server corresponding to the game.

In a game scene of the game, there is a stage region as shown in game scene 1, where the first object is a player object controlled in the game. If a player expects that the first object is a livestreamer livestreaming in the game scene, the first object may be controlled by the terminal device 101 to perform an interaction behavior for livestreaming in the game scene. As shown in the figure, in this actual application scene, the player may control the first object to move to the stage region through the terminal device 101 and to approach a livestreaming platform on the stage region. The livestreaming platform is a virtual prop for livestreaming. There is also a virtual screen as shown in game scene 1 in the stage region. When there is no player object performing livestreaming, the virtual screen may not display content or only display a preset fixed content. When there is a player becoming a livestreamer, the virtual screen may display a livestreaming content provided by the livestreamer.

When the first object approaches the livestreaming platform, a virtual control of "Start livestreaming" appears on a game interface, and the player may click/tap the virtual control to control the first object to interact with the livestreaming platform (namely, an interaction behavior for livestreaming). The terminal device 101 transmits the interaction behavior performed by controlling the first object to the server 102. If the server 102 determines that the interaction behavior satisfies a livestreaming condition, an identity instruction is generated and transmitted to the terminal device 101. The identity instruction is used for indicating that the first object is a livestreamer in the game scene.

After the first object obtains a livestreamer identity, the terminal device 101 may determine a livestreaming content livestreamed in the game scene. In this actual application scene, as shown in game scene 2, the livestreaming content may include actions performed by the first object under the control of the player in a stage region and a corresponding background video, audio, and the like in the stage region. For example, the player may control the first object to sing on a stage and may autonomously select a song to be sung and a background video to be displayed in a screen on the stage through the livestreaming platform. As shown in the figure, the terminal device may record an object action of the first object, obtain a sound, a selected background video, and the like emitted by the player through the first object, determine the object action, the sound, and the background video as a livestreaming content corresponding to the livestreaming, and display the livestreaming content at a livestreaming display position in the game scene. For example, the livestreaming content may be displayed in a virtual screen or a virtual television in the game scene. Meanwhile, in order to enable the player controlling other player objects in the game scene to also view the livestreaming content, the terminal device 101 may transmit the livestreaming content to the server 101. The server 101 can push the livestreaming content to a plurality of terminal devices, such as terminal device 1, terminal device 2, and terminal device n. Therefore, these terminal devices can also display the livestreaming content at the livestreaming display position in the game scene, so as to achieve a livestreaming effect of livestreaming a plurality of players in the game scene by using the first object as a livestreamer.

It can be seen therefrom that this disclosure provides a new livestreaming interaction manner in a game scene in which a player is a dominant player for livestreaming and a livestreaming content is determined by the player. The interaction manner is not limited by a game type. The player may experience a livestreaming interaction close to real life in the game scene by controlling a player object, without going through a realistic and tedious livestreaming operation. Therefore, the threshold for experiencing a livestreamer is reduced while enriching the interaction manner in a game and the player experience. In addition, since the player only needs to control the first object for livestreaming and there is no need for the player to display own related information, the acceptance of the player is higher and the player is safer compared to real livestreaming.

An interaction method in the embodiments of this disclosure is described next with reference to the drawings.

Figure 2:
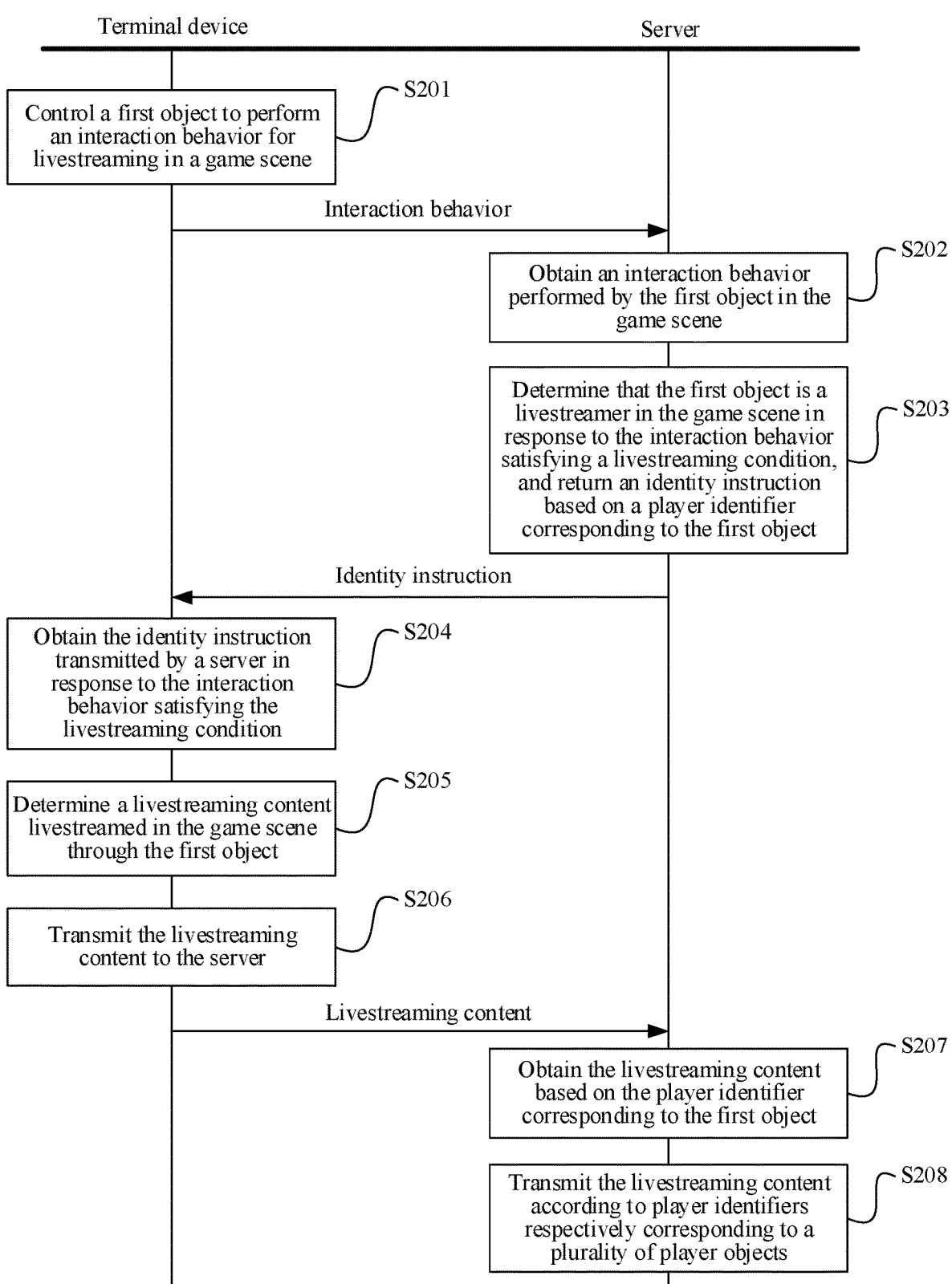
FIG. 2 is a signaling diagram of an interaction method according to an embodiment of this disclosure.

FIG. 2 is a signaling diagram of an interaction method according to an embodiment of this disclosure. The method may be applied to a system including a first terminal device and a server. The method includes the following steps:

In step S201, control, by the first terminal device, a first object to perform an interaction behavior for livestreaming in a game scene.

In order to enrich the interaction experience of a player in a game, the player may be provided with a new livestreaming interaction in the embodiments of this disclosure, and the player may experience a livestreaming interaction in the game that is not limited to the game type.

First, an interaction behavior for obtaining a livestreamer identity may be set in the game. If a player object in a game scene of the game successfully obtains the livestreamer identity and becomes the livestreamer, the player controlling the player object may dominate a livestreaming content livestreamed in the game scene through the player object. The player object refers to a game object that may be controlled by the player in the game scene, for example, various types of game characters provided in the game, and the like.

Therefore, if the player is to perform livestreaming in the game scene through the controlled first object when playing the game, the first object may be controlled to perform an interaction behavior for livestreaming in the game scene through the first terminal device running the game. The first object is one of a plurality of player objects included in the game scene.

In step S202, obtain, by the server, an interaction behavior performed by the first object in the game scene.

In order to determine whether the first object can perform livestreaming in the game scene, the server may analyze an interaction behavior obtained from the first terminal device to determine whether the first object can obtain the livestreamer identity through the interaction behavior.

In step S203, determine, by the server, that the first object is a livestreamer in the game scene in response to the interaction behavior satisfying a livestreaming condition, and return an identity instruction based on a player identifier corresponding to the first object.

The livestreaming condition corresponding to the game scene may be stored in the server. The livestreaming condition is used for determining whether the player object can obtain the livestreamer identity in the game scene through the interaction behavior performed. If it is determined that the interaction behavior satisfies the livestreaming condition, it indicates that the livestreamer identity may be obtained through the interaction behavior. At this moment, the server may determine that the first object is the livestreamer in the game scene, namely determine that the first object has a permission of livestreaming in the game scene.

It may be understood that each player object in the game has a corresponding player identifier. The player identifier is used for identifying a player controlling the player object. Since the player controls the player object through the first terminal device, the player identifier and the first terminal device controlling the player object also have a corresponding relationship when playing a game. That is, the first terminal device controlling the player object may be determined through the player identifier corresponding to the player object. Based on this, in order to enable the first terminal device controlling the first object to learn that the first object has obtained the livestreamer identity, the server 101 may return an identity instruction based on the player identifier corresponding to the first object. The identity instruction is used for indicating that the first object is the livestreamer in the game scene.

In step S204, obtain, by the first terminal device, the identity instruction in response to the interaction behavior satisfying the livestreaming condition.

Through the player identifier corresponding to the first object, the server may accurately determine the first terminal device controlling the first object, thereby enabling the first terminal device to obtain the identity instruction. Through the identity instruction, the first terminal device may determine that the first object becomes the livestreamer in the game scene, so as to start the execution of an operation related to the livestreamer.

In step S205, determine, by the first terminal device, a livestreaming content livestreamed in the game scene through the first object.

Figures 4, 5:
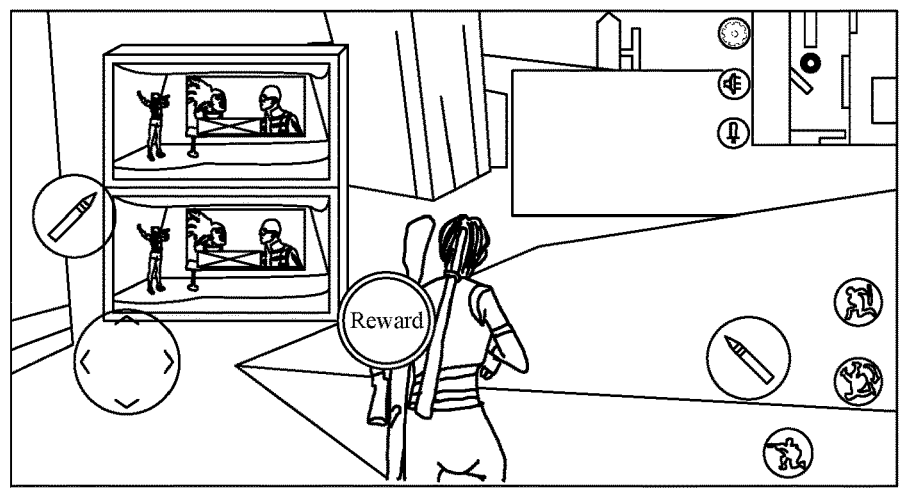
FIG. 4 is a schematic diagram of an interaction method according to an embodiment of this disclosure.
FIG. 5 is a schematic diagram of an interaction method according to an embodiment of this disclosure.

The livestreaming content is used for being livestreamed at a livestreaming display position in the game scene. The livestreaming display position is a position in the game scene for displaying or playing the livestreaming content, such as a virtual screen in the game scene. For example, as shown in FIG. 4, there may be a display apparatus at the livestreaming display position. The display apparatus may be a virtual apparatus for displaying the livestreaming content. The player may view the livestreaming content by controlling the player object to approach the display apparatus, or view the livestreaming content by interactively manipulating the display apparatus. This is not limited herein.

Since the first object is the livestreamer in the game scene, the player may determine a livestreaming content to be livestreamed through the first object. The first terminal device may determine the livestreaming content to be livestreamed by the player in the game scene by means of a selection operation of the player and the like, so as to provide a player-dominated interaction manner for livestreaming in the game scene, thereby enriching the interaction experience of the player when playing the game. Meanwhile, it is not necessary to first perform a series of tedious operations such as identity authentication, livestreaming software download, and account registration in real life, instead it is only necessary to control the player object to perform a relatively simple interaction behavior in the game scene. Therefore, this method also provides a more convenient livestreamer experience manner for the player, thereby reducing the threshold of livestreaming interaction.

In step S206, transmit, by the first terminal device, the livestreaming content to the server.

In order for the player controlling other player objects in the game scene to also receive the livestreaming content, the first terminal device may transmit the livestreaming content to the server, and the server broadcasts the livestreaming content to the first terminal device of another player.

In step S207, obtain, by the server, the livestreaming content based on a player identifier corresponding to the first object.

Through the player identifier corresponding to the first object, the server may determine that the livestreaming content is the livestreaming content determined for the livestreamer in the game scene, and thus may determine that the livestreaming content has a permission of livestreaming to other player objects.

In step S208, transmit, by the server, the livestreaming content according to player identifiers respectively corresponding to a plurality of player objects.

Through the player identifiers respectively corresponding to the plurality of player objects, the server may determine first terminal devices respectively corresponding to the plurality of player objects, and thus may transmit the livestreaming content to these first terminal devices, so that these first terminal devices can display the livestreaming content to the player objects at the livestreaming display position in the game scene, thereby achieving an interaction effect of simulating livestreaming interaction in a real scene.

The manners in which the server transmits the livestreaming content may also be different based on different game types. For example, when the game is a game running in the first terminal device, the server may directly transmit the livestreaming content to the first terminal device, and the first terminal device performs livestreaming at the livestreaming display position in the game scene based on the livestreaming content. When the game is a cloud game, since the game is actually run on the server, the first terminal device only receives a game picture corresponding to the game. Therefore, in an implementation, the livestreaming content may be displayed or played in the game scene by the server, and the game picture corresponding to the player object is transmitted to the first terminal device.

In an implementation, a target object may be included in the plurality of player objects in the game scene. Taking the target object as an example, the server may first determine a game picture corresponding to the target object according to the target object and the livestreaming content. For example, the server may determine whether the target object can receive the livestreaming content according to an object position corresponding to the target object and the livestreaming display position, and may determine a specific situation of receiving the livestreaming content, such as an angle of viewing the livestreaming content or the volume of listening to the livestreaming content, so as to determine a more reasonable game picture.

The first terminal device may determine game pictures respectively corresponding to the plurality of player objects in the foregoing manner, and then transmit the game pictures respectively corresponding to the plurality of player objects according to the player identifiers respectively corresponding to the plurality of player objects. Thus, the first terminal device only needs to have the function of receiving the game pictures, and there is no need to analyze and display the livestreaming content, thereby reducing, to some extent, the processing pressure of the livestreaming interaction on the first terminal device. Therefore, the interaction method can be applied to more first terminal devices, which is beneficial to the promotion of the livestreaming interaction.

It can be seen from the foregoing technical solution that a first object may be controlled to perform an interaction behavior for livestreaming in a game scene. In response to the interaction behavior satisfying a livestreaming condition, an identity instruction for indicating that the first object is a livestreamer in the game scene is obtained. Thus, a player may serve as the livestreamer to determine a livestreaming content by controlling the first object in a game. The livestreaming content may be livestreamed to other player objects in the game scene at a livestreaming display position. By organically integrating the livestreaming manner into the game, a new player-dominated interaction manner for performing livestreaming interaction between the player objects in the game scene is realized. Therefore, the interaction manner in the game is not limited by the type of the game, thereby further enriching the diversity of play methods in the game and improving the interaction experience of the player in the game. Moreover, the player may experience livestreaming as the livestreamer by only controlling the player object. Therefore, the livestreaming experience threshold in the game scene is lower than that in the related art in which livestreaming authentication is required and applications are additionally installed.

In addition, audiences of the livestreaming content livestreamed based on the livestreamer in the game scene may not be limited to player objects in the game scene. In order to expand the user population that may participate in the livestreaming interaction and improve the popularity of the livestreaming interaction, in an implementation, on the one hand, the livestreaming content may be used for livestreaming for the plurality of player objects at the livestreaming display position in the game scene. For example, other players may view the livestreaming content by controlling the corresponding player objects to move to the livestreaming display position in the game scene, or may control the player objects to interact with related props in the livestreaming display position to view the livestreaming content. On the other hand, the livestreaming content may be used for livestreaming on a livestreaming platform based on the livestreaming display position in the game scene. Thus, when a user without a player object in the game scene is to view the livestreaming content, the livestreaming content determined based on the livestreamer in the game scene may also be viewed through the livestreaming platform. Other manners which can be used for viewing the livestreaming content may also be applied to the technical solution of this disclosure. For example, the livestreaming content may also be directly transmitted to a terminal device corresponding to a user, and the livestreaming content may be played by related video playing software in the terminal device. This is not limited herein.

In an implementation, after the livestreamer in the game scene determines the livestreaming content, other players may view the livestreaming content in the game scene through terminal devices held thereby. FIG. 17 is a flowchart of an interaction method according to an embodiment of this disclosure. The method may be implemented by a second terminal device corresponding to a third object. The method includes the following steps:

In step S1701, obtain a livestreaming content generated based on a first object.

The first object is a livestreamer in a game scene. The game scene includes the first object and a third object. Both the first object and the third object are player objects in the game scene. After a terminal device corresponding to the first object generates a livestreaming content based on the first object in the foregoing manner, the livestreaming content may be transmitted to a server, the server may transmit the livestreaming content to a second terminal device corresponding to the third object through a player identifier of the third object, whereby the second terminal device displays the corresponding livestreaming content for the third object in the game scene.

In step S1702, determine a livestreaming display position in the game scene.

The livestreaming display position is a position for displaying or playing the livestreaming content in the game scene, such as a virtual stage shown in FIG. 1. The second terminal device may first determine the corresponding livestreaming display position in the game scene, so as to perform livestreaming based on the livestreaming display position.

In step S1703, livestream the livestreaming content for the third object at the livestreaming display position according to a positional relationship between an object position of the third object and the livestreaming display position in the game scene.

In order to enable the player to obtain the livestreaming content livestreamed by a livestreamer based on the third object, the second terminal device may perform livestreaming for the third object at the livestreaming display position according to the livestreaming content, and the player controlling the third object may view or listen to the livestreaming content based on the third object. In order to enrich the interest and diversity of the interaction in the game, the terminal device may provide the player with a variety of manners to experience the livestreaming content livestreamed in the game scene.

For example, the livestreaming interaction may be combined with a metaverse technology, and the second terminal device may be a variety of devices capable of enhancing the audiovisual experience of the player. In an implementation, the second terminal device may be a virtual reality (VR) device. By wearing the VR device, the player may obtain the experience of playing as the third object into the game scene, so as to view or listen to the livestreaming content at the livestreaming display position in the game scene. In another implementation, the second terminal device may be an augmented reality (AR) device. By means of the second terminal device, the game scene may be combined with a real environment in which the player is located, so that the player can perceive the content in the game scene in the real environment. For example, the game scene may be a scene created based on the real environment in which the player is located, the livestreaming display position may correspond to a designated position in the real environment, and the third object may move in the game scene as the player moves in the real environment. The player moves to the designated position through an indication content in the game scene. Thus, the livestreaming content may be viewed or heard in the real environment in the game scene or projected by the second terminal device, so as to realize a multi-dimensional player game experience, thereby further improving the interest of interaction.

To further enrich the interaction experience of the livestreaming interaction in the game, the processing device may also provide the player with a variety of interaction behaviors capable of obtaining the livestreamer identity.

In an implementation, the processing device may set a virtual prop for obtaining a livestreaming permission in a particular region in the game scene, and the player may control the player object to move to the particular region and interact with the virtual prop to obtain the livestreamer identity for livestreaming. In this implementation, the interaction behavior may include a first target behavior for obtaining a livestreaming permission. The livestreaming permission refers to a permission of livestreaming as a livestreamer. After obtaining a control operation performed by the player, the first terminal device may control the first object to perform the first target behavior with a target virtual prop. The target virtual prop is located in a livestreaming permission obtaining region in the game scene. The livestreaming permission obtaining region refers to a region in the game scene for obtaining the livestreamer identity for livestreaming. After obtaining the first target behavior, the server may determine whether the first target behavior successfully obtains the livestreaming permission. The first terminal device may obtain, in response to obtaining the livestreaming permission through the first target behavior, an identity instruction to indicate that the first object becomes the livestreamer in the game scene.

For example, in the game scene in FIG. 1, a region corresponding to the virtual stage may be the livestreaming permission obtaining region. A livestreaming platform on the stage is the target virtual prop. The first target behavior may be a touch operation between the first object and the livestreaming platform. The player may control the first object to move to the stage region through the first terminal device, and control a touch operation between the first object and the livestreaming platform by clicking/tapping a "Start livestreaming" virtual space in a game interface. After determining that the livestreaming permission may be obtained through the touch operation, the server may return an identity instruction to the first terminal device, to indicate that the first object may perform livestreaming as the livestreamer in the game scene. The livestreaming permission is obtained in a manner of interacting with the virtual prop in the particular region, a relatively definite manner of obtaining the livestreaming permission may be provided for the player, and it is not required to interact with other player objects, for example, not required to defeat or knock down other player objects, so as to provide a relatively harmonious livestreaming interaction manner between players. For example, a plurality of players may negotiate to determine the distribution of the livestreaming permission, so as to facilitate, to some extent, interactive communication between the players.

In addition, in order to improve the interactivity between the plurality of player objects in the game scene, in another implementation, the processing device may also provide the player with a manner to obtain the livestreamer identity in the game scene by interacting with other player objects in the game scene. In this implementation, the interaction behavior may include a second target behavior for livestreamer identity exchange. Based on a control operation performed on the first terminal device by the player, the first terminal device may control the first object to perform the second target behavior with the second object in the game scene. The second object is the livestreamer in the game scene. That is, if the player desires the first object to become a livestreamer, the first object needs to be controlled to obtain the livestreamer identity from the second object.

After the first terminal device transmits the second target behavior to the server, the server may determine whether to complete livestreamer identity exchange through the second target behavior. The livestreamer identity exchange refers to that the livestreamer is converted from the second object to the first object. If the server determines that the livestreamer identity exchange is completed through the interaction behavior, namely the second target behavior, the livestreamer in the game scene may be converted from the second object to the first object, and a corresponding identity instruction is transmitted to the first terminal device. Meanwhile, the server needs to obtain a livestreaming content determined based on the second object during the time when the second object is the livestreamer in the game scene. Therefore, after the livestreamer is converted to the first object, the server may terminate the obtaining of the livestreaming content based on a player identifier corresponding to the second object, so as to obtain a livestreaming content from a new livestreamer more accurately and broadcast the livestreaming content. For example, when the livestreaming content is a game video corresponding to a game object, the server may start to obtain the game video corresponding to the first object and terminate the obtaining of the game video corresponding to the second object after the livestreamer is converted to the first object.

The first terminal device may obtain the identity instruction to indicate that the first object has become the livestreamer in the game scene instead of the second object. Since player objects need to interact with each other to obtain the livestreamer identity, interaction and communication between game players are promoted to some extent, thereby improving the cooperation and competitiveness of the game. A player having the livestreamer identity needs to protect the livestreamer identity from being obtained by other player objects, and a player not having the livestreamer identity needs to try to obtain the livestreamer identity, thereby improving the playability of the game.

FIG. 18 is a flowchart of an interaction method according to an embodiment of this disclosure. The method includes the following steps:

In step S1801, control a first object to perform an interaction behavior for a second object in a game scene.

Both the first object and the second object are one of a plurality of player objects in the game scene, and the second object is a livestreamer in the game scene. In order to enable the first object controlled by a player to obtain a livestreamer identity in the game scene, the player may control, through a first terminal device, that the first object performs an interaction behavior for the second object in the game scene. For example, the second object may be knocked down by means of interaction in various games, and the like.

In step S1802, obtain an identity instruction in response to the interaction behavior satisfying a livestreaming condition.

The first terminal device may transmit the interaction behavior performed by controlling the first object to a server, and the server determines that the first object can obtain the livestreamer identity of the second object through the interaction behavior. The livestreaming condition corresponding to the game scene may be stored in the server. The livestreaming condition is used for determining whether the player object can obtain the livestreamer identity in the game scene through the interaction behavior performed. For example, in this embodiment, the livestreaming condition may be that a health value of the second object in the game scene falls to 0. If the interaction behavior satisfies the livestreaming condition, the server may determine that the first object successfully knocks down the second object, and determine that the first object obtains the livestreamer identity of the second object.

After the server determines that the interaction behavior satisfies the livestreaming condition, the first terminal device may obtain an identity instruction. The identity instruction is used for converting the livestreamer in the game scene from the second object to the first object.

In step S1803, determine a livestreaming content livestreamed in the game scene.

After determining that the first object is a new livestreamer in the game scene, the first terminal device may determine a livestreaming content livestreamed in the game scene according to a related operation of a player controlling the first object. The livestreaming content is used for performing livestreaming at a livestreaming display position in the game scene. Based on the foregoing technical solution, when there is already a livestreamer in the game scene, the player may realize the conversion of the livestreamer identity by controlling a manner in which the player object interacts with the livestreamer, so as to improve the enthusiasm of interaction between player objects.

For example, in an actual application scene, the game may be a shooting game, and the second target behavior may be shooting at the second object. If the player is to obtain the livestreamer identity, the first object needs to be controlled by the first terminal device to shoot at the second object having the livestreamer identity, and the first object becomes the livestreamer in the game scene by knocking down the second object. After obtaining the shooting behavior, the server may determine whether the shooting behavior can knock down the second object, for example zero the health value of the second object or disable the second object. If it is determined that the second object may be knocked down, it is determined that the livestreamer identity exchange may be completed through the shooting behavior. The first terminal device may obtain an identity instruction to indicate that the first object becomes a new livestreamer.

Figure 9:
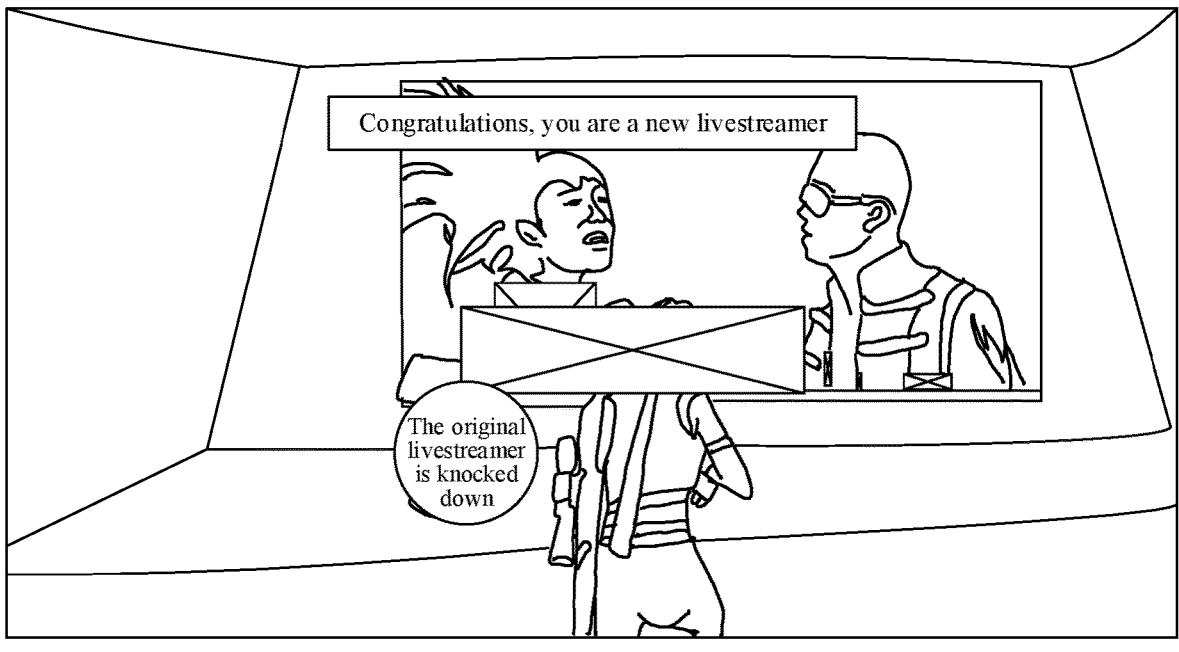
FIG. 9 is a schematic diagram of an interaction method according to an embodiment of this disclosure.

After obtaining the livestreamer identity, in order to notify a plurality of player objects in the game scene about the change situation of the livestreamer in the current game scene, in an implementation, the server may transmit an identity prompt according to player identifiers respectively corresponding to the plurality of player objects in response to the interaction behavior satisfying a livestreaming condition. The identity prompt is used for prompting the first object to obtain the livestreamer identity. After receiving the identity prompt, the first terminal device may display a prompt prompting the first object to obtain the livestreamer identity. In addition, with regard to the first terminal device corresponding to the first object obtaining the livestreamer identity, after obtaining the identity instruction, the first terminal device has learned that the first object becomes a new livestreamer. Therefore, the prompt prompting the first object to obtain the livestreamer identity may be directly displayed without waiting for the server to transmit an identity prompt, so as to inform the player controlling the first object that the livestreamer identity has been successfully obtained, thereby enabling the player to perform a subsequent operation of dominating a livestreaming content. As shown in FIG. 9, if the player obtains the livestreamer identity by controlling the first object to knock down the second object serving as the original livestreamer, the first terminal device may display, on a game interface corresponding to the first object, a prompt that the first object knocks down the original livestreamer and a prompt of complimenting that the player becomes a new livestreamer.

In addition to providing the player with a variety of interaction manners of obtaining the livestreamer identity, the processing device may also provide the player with a variety of options of livestreaming content when livestreaming is dominated by the player in order to improve the freedom and richness of livestreaming in the game scene.

First, the processing device may provide the player with a variety of livestreaming modes for livestreaming and provide the player with different options of livestreaming content based on the different livestreaming modes. In an implementation, the first terminal device may display a livestreaming mode selection interface. The livestreaming mode selection interface includes a plurality of livestreaming modes for allowing the player to select a livestreaming mode from the plurality of livestreaming modes for livestreaming. The livestreaming mode may refer to a mode for generating a livestreaming content.

The first terminal device may obtain a mode selection operation based on the livestreaming mode selection interface. The mode selection operation is an operation that is performed by the player based on the livestreaming mode selection interface and used for selecting a target livestreaming mode from the plurality of livestreaming modes. The target livestreaming mode is a livestreaming mode in which the player is to perform livestreaming in the game scene. The first terminal device may determine a livestreaming content livestreamed in the game scene according to the target livestreaming mode, so that the livestreaming content can conform to the target livestreaming mode, thereby guaranteeing the rationality of the livestreaming content and improving the livestreaming effect.

In this disclosure, the livestreaming mode may be divided into a live radio mode and a game perspective mode. The two livestreaming modes will be described in detail next.
(1) Live Radio Mode In an implementation, the target livestreaming mode may be a radio mode. In this mode, a player may livestream audio information such as favorite music or the player's own voice to other player objects in a manner similar to a live radio in real life.

The first terminal device may display an audio content selection interface. The audio content selection interface includes a plurality of audio contents, and the player may select favorite audio contents to be livestreamed to other player objects. The first terminal device may obtain an audio selection operation based on the audio content selection interface. The audio selection operation is used for selecting a target audio content from the plurality of audio contents. The target audio content is an audio content to be livestreamed by the player controlling the first object.

Meanwhile, the first terminal device may also generate a player audio content by the first object through a microphone or the like. The player audio content is used for recording sound emitted by the player in controlling the first object to livestream. The first terminal device may determine the livestreaming content livestreamed in the game scene through the target audio content and the player audio content. After transmitting the livestreaming content to the plurality of player objects through the server, the player controlling the plurality of player objects may listen to the target audio content and the player audio content from the livestreaming display position in the game scene, thereby enabling simulation of a radio broadcast manner.

In addition to selecting the audio content for livestreaming, the first terminal device may also provide the player with an alternative video content for livestreaming. In an implementation, a plurality of audio contents provided at the audio content selection interface may all have corresponding video contents. For example, when the audio content is music, the video content may be a music video (MV) corresponding to the music. After determining a target audio content selected by the player based on the audio content selection interface, the first terminal device may determine a target video content corresponding to the target audio content, and then determine the target video content, the target audio content, and the player audio content as the livestreaming content for livestreaming. It may be understood that there may or may not be a corresponding relationship between the target video content and the target audio content, and the player may select any video content as the target video content.

Figure 3:
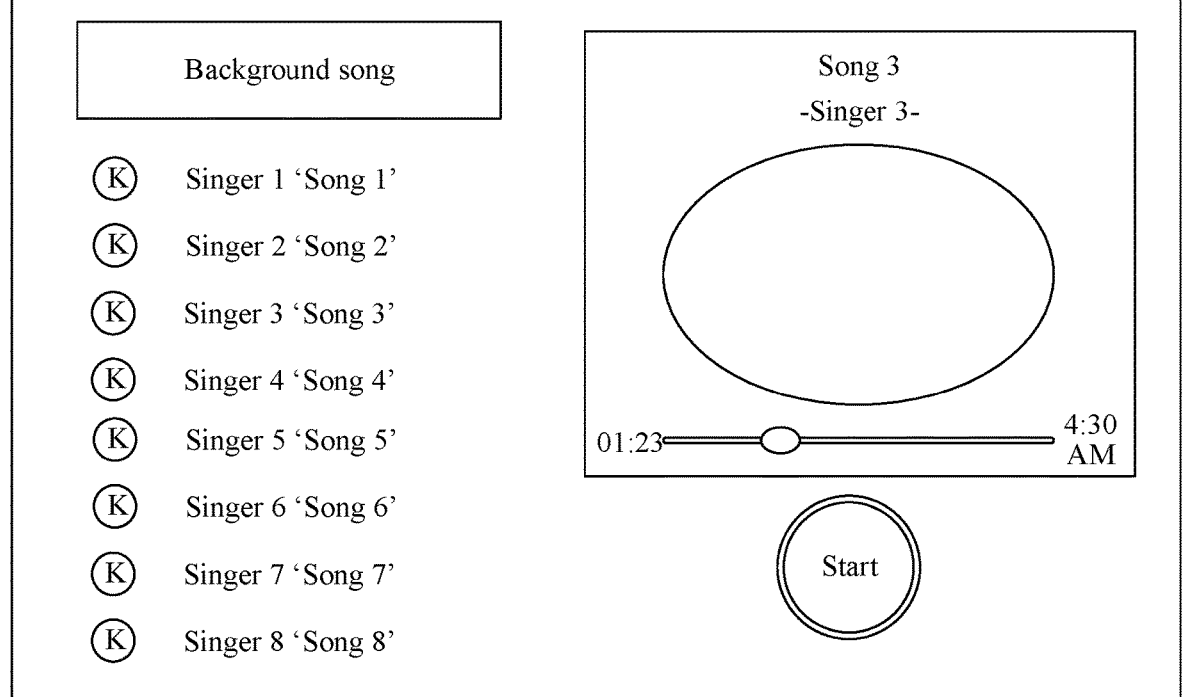
FIG. 3 is a schematic diagram of an interaction method according to an embodiment of this application.

In addition, the player may perform an object action in the game scene by controlling the first object, and the first terminal device may determine the object action as part of the livestreaming content. FIG. 3 shows an exemplary audio content selection interface. After the first terminal device controls the first object to interact with the livestreaming platform in FIG. 1, the audio content selection interface may be displayed for a player. The audio content selection interface includes eight songs of eight singers for selection by the player. In FIG. 3, the player selects song 3 and may then click/tap a "Start" button in the interface to start livestreaming. After starting the livestreaming, the first terminal device may take song 3 as background music of the livestreaming content and take sound emitted by the player as background human voice of the livestreaming content through the microphone on the first terminal device. Meanwhile, MV corresponding to song 3 may also be displayed on the virtual screen of the stage region in FIG. 1, and the player may also control the first object to perform a singing action in the stage region. The first terminal device may determine the background music, the background human voice, the MV, and the object action as a livestreaming content livestreamed currently, and transmit the livestreaming content to the server. Alternatively, the first terminal device may directly record a video content corresponding to the virtual stage in a fixed view in the game, so that the video content may include the foregoing livestreaming content. The first terminal device may transmit a video with the livestreaming content to the server, so that other first terminal devices can also display the video content with the livestreaming content in the game scene.

(2) Game Perspective Mode

In a game, some game players desire to share own game operations. For example, in a shooting game, a player may share precise shooting operations, flexible object movement operations, and the like with other game players. Meanwhile, another player may also have a greater viewing interest in livestreaming of game operations when viewing livestreaming in a game scene, such as desiring to learn game operations of other players. Based on this, in an implementation, the first terminal device may also provide the player with a game perspective mode. In this game perspective mode, the player controlling the first object may livestream for other player objects at a first-person perspective as a livestreaming content.

The first terminal device may first determine a game video of the first object in the game scene. The game video is used for recording a game perspective corresponding to the first object. For example, the first terminal device may record a game interface in which the player controls the first object to play a game. The recorded video is taken as the game video. The first terminal device may determine a livestreaming content livestreamed in the game scene according to the game video of the first object in the game scene. Thus, when other players view the livestreaming content in the game scene, the players may intuitively appreciate game operations performed by the player controlling the first object, so as to meet the operation display requirements of the players. In addition, since the game video displays the perspective corresponding to the first object, the livestreaming content also exposes, to some extent, information such as a current location of the first object. Other players, after viewing the livestreaming content, may control the player object to actively seek the first object for interaction, thereby also improving the interaction between the players to some extent.

For example, when a livestreamer identity in the game scene needs to be obtained by knocking down a player object having the livestreamer identity, a player who desires to obtain the livestreamer identity may know location information of the player object as a livestreamer through the livestreaming content in such a livestreaming mode, thereby controlling the player object of the player to find the livestreamer and knock down the livestreamer to obtain the livestreamer identity.

Through the foregoing plurality of livestreaming modes and diversified livestreaming contents, the processing device may provide a player with a rich livestreaming interaction experience, thereby satisfying different livestreaming requirements of the player for sharing favorite music and video or displaying game skills of the player. Thus, the player can perform a lively livestreaming interaction through a simple game operation, thereby improving the game experience of the player.

In addition to providing a variety of livestreaming contents and livestreaming modes for selection by the livestreamer, the processing device may improve the experience of the player in controlling the player object to view or listen to the livestreaming content through more elaborate settings.

It may be understood that in real life, as a person views video or hears audio, what is viewed or heard will be changed as the playing position and the location are changed. For example, as being farther away from the playing position where audio is played, the less sound is heard. When the video is viewed at different perspectives, the video contents viewed will be different. Based on this, in an implementation, in order to improve the sense of reality of the game scene, after determining the livestreaming content, the second terminal device may first determine an object position of the second object in the game scene, and then display or play, according to a positional relationship between the object position and a livestreaming display position in the game scene, the livestreaming content through the livestreaming display position, so that the second terminal device can rationally adjust the livestreaming content received by the player object based on the positional change of the player object, thereby simulating the experience of video viewing or audio listening in a real scene, and improving the sense of reality of the game scene.

For example, as shown in FIG. 4, when a player object (for example, the second object) is farther from the livestreaming display position, it is difficult for the player object to clearly view the livestreaming content through a livestreaming display apparatus since the livestreaming content is small. When the player controls the player object to approach the livestreaming display position, the livestreaming content may be displayed for the player object in a larger region in the game interface as the distance between the display apparatus and the player object is reduced, so that the player may view more clearly through the player object. Similarly, when the player object is farther away from the livestreaming display position, the second terminal device may play the livestreaming content for the player object at a lower volume. When the player object is closer to the livestreaming display position, the second terminal device may play the livestreaming content for the player object at a higher volume.

In addition, if the player desires to view the livestreaming content more clearly and intuitively, the second terminal device may further provide the player with a livestreaming content viewing interface for viewing the livestreaming content, and the player may view the livestreaming content more clearly through the livestreaming content viewing interface. Meanwhile, when viewing livestreaming, a player may need to interact with a player corresponding to a livestreamer. For example, it may be desirable to chat with the player corresponding to the livestreamer, give gifts, and the like. In order to enable these interactions to be clearly received by the player so as to enable good interaction between the players, the terminal device may also provide the player with an interface for viewing the interaction content.

Based on this, in an implementation, the second terminal device may perform a viewing operation on the display apparatus at the livestreaming display position through the first object. The viewing operation is used for viewing an interface corresponding to the display apparatus. The second terminal device may display the livestreaming content viewing interface in response to the viewing operation. The livestreaming content viewing interface includes a player interaction display region and a livestreaming content display region. The player interaction display region is used for displaying a player interaction message and a virtual item transfer record. The player interaction message refers to a message for communicating and interacting between the players. The virtual item transfer record is used for recording a virtual item transferred by the player for the livestreaming content, for example, a virtual prop or the like given to the livestreamer by the player for the livestreaming content. The livestreaming content display region is used for displaying the livestreaming content. Thus, through the livestreaming content viewing interface, the player can not only view the livestreaming content corresponding to livestreaming, but also view communication and interaction between other players or the player for the livestreaming content, thereby further enriching the livestreamer interaction experience of the player.

Taking a player and a terminal device corresponding to the third object as an example, in the process of viewing or listening to a livestreaming content, if the player desires to transmit a player interaction message related to the livestreaming content, the second terminal device may display an interaction message input interface for the livestreaming content. The interaction message input interface is used for inputting a player interaction message corresponding to the livestreaming content, for example, an interface shown in FIG. 6. A message region above the interface may be used for inputting the player interaction message. The terminal device may obtain a message input operation based on the interaction message input interface. The message input operation is an operation performed by the player for inputting the player interaction message, and is used for inputting the player interaction message for the livestreaming content. For example, the message input operation may be an operation such as typing input or voice input. The second terminal device may display the player interaction message in a player interaction display region corresponding to the livestreaming content, so that the player can view the player interaction message transmitted by the player and other players, thereby performing message interaction.

Figure 6:
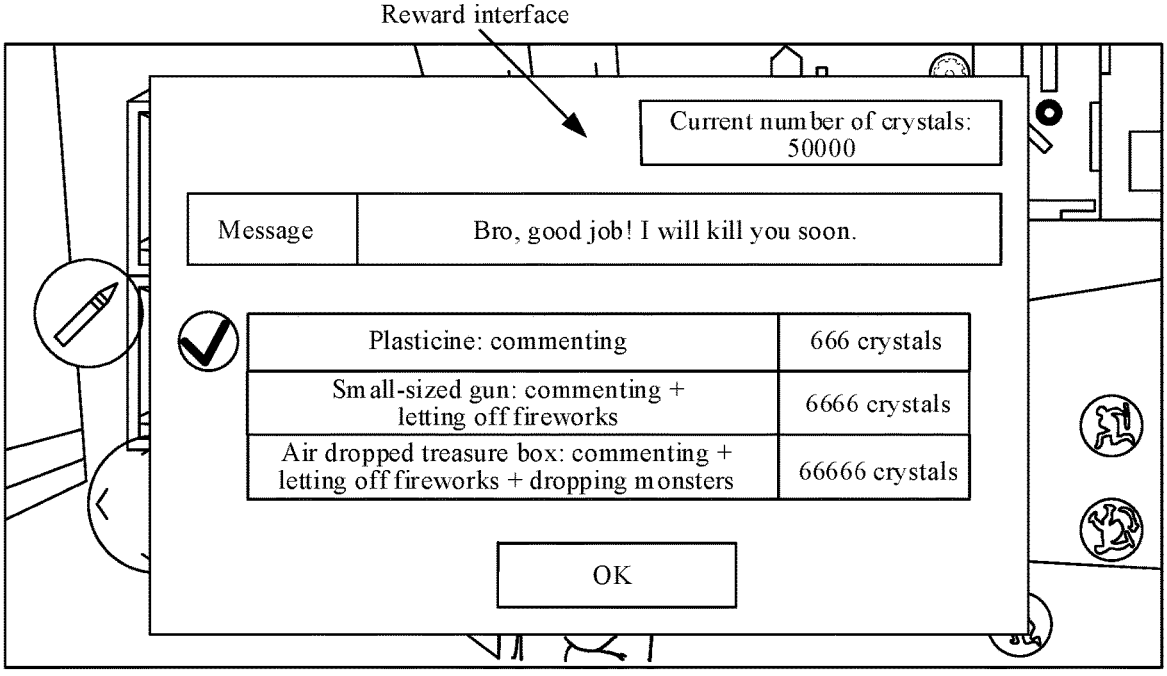
FIG. 6 is a schematic diagram of an interaction method according to an embodiment of this disclosure.

In addition, when the player has a demand for virtual item transfer for the livestreaming content, for example, desires to give a virtual item as a gift to the livestreamer, the second terminal device may display a virtual item transfer interface for the livestreaming content. The virtual item transfer interface includes a plurality of virtual items. As shown in FIG. 6, the virtual item transfer interface displayed in FIG. 6 may include a plurality of virtual items such as a plasticine or a small-sized gun.

The second terminal device may obtain an item selection operation based on the virtual item transfer interface. The item selection operation is used for selecting a target virtual item from the plurality of virtual items. The target virtual item is a virtual item to be transferred currently by the player. The second terminal device may display a virtual item transfer record corresponding to the target virtual item in the player interaction display region corresponding to the livestreaming content. For example, if the player selects to give a plasticine to the livestreamer through the interface shown in FIG. 6, a record of "A player gives a plasticine to a livestreamer" may be displayed in the player interaction display region, thereby enabling interaction between a plurality of players based on the transfer of the virtual item and improving the richness of livestreaming interaction.

For example, when the player is viewing livestreaming in the game scene, the player interaction message such as a comment may be transmitted for the livestreaming content by the second terminal device, the virtual item may be transferred for the livestreaming content, or the like. At this moment, the server may obtain an interaction information display request that is transmitted by the second terminal device and initiated for the livestreaming content. The interaction information display request includes interaction information. The interaction information display request is used for requesting the server to display the interaction information in the player interaction display region. The interaction information may include at least one of a player interaction message and a virtual item transfer record.

As described above, the server may determine, through a player identifier corresponding to a player object, a terminal device corresponding to the player object. Therefore, the server may transmit the interaction information according to player identifiers respectively corresponding to the plurality of player objects. The interaction information is used for being displayed in a player interaction display region corresponding to the livestreaming content. Thus, a plurality of players controlling the plurality of player objects in the game scene may all view the interaction information between the players through the player interaction display region.

Figure 7:
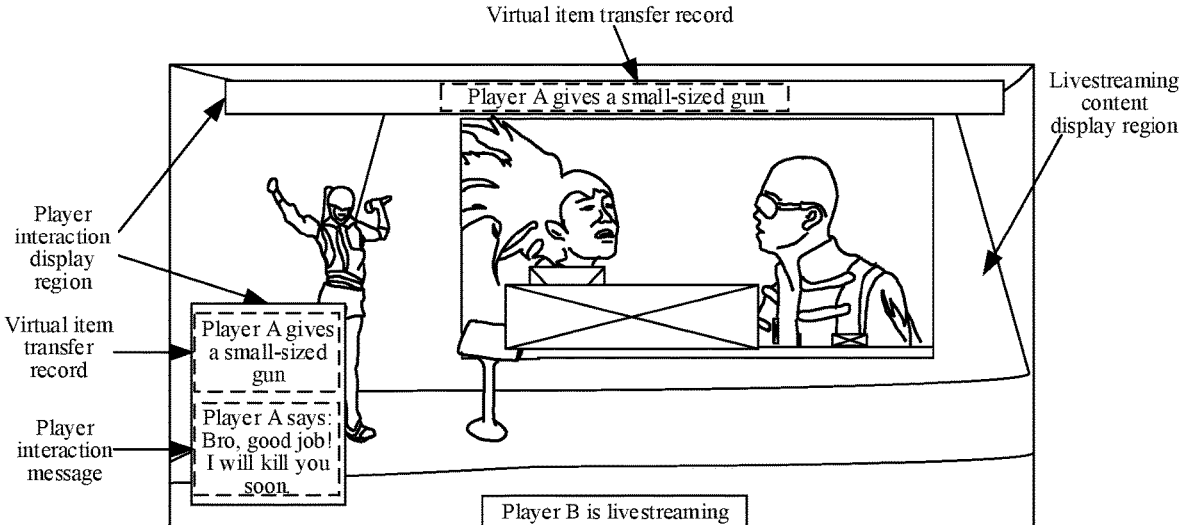
FIG. 7 is a schematic diagram of an interaction method according to an embodiment of this disclosure.

For example, as shown in FIG. 5, when player A controls a player object to approach the display apparatus, a virtual button "Reward" may appear in the game interface. After player A clicks/taps the button, a reward interface as shown in FIG. 6 may be displayed, and player A may select, through the interface, a virtual item to be given to the livestreamer and an interaction message transmitted for the livestreaming content. As shown in the figure, the player interaction message may be a message transmitted by the player through the interface, and the virtual item may include a plasticine, a small-sized gun, an air dropped treasure box, and the like. After determining a message to be transmitted and a virtual item to be given by player A, the terminal device may determine a corresponding player interaction message and virtual item transfer record, so as to transmit an interaction information display request to the server. The server may transmit interaction information corresponding to the request to terminals corresponding to a plurality of player objects, so as to display the interaction information in the player interaction display region. As shown in FIG. 7, FIG. 7 shows a livestreaming content viewing interface. The livestreaming content viewing interface includes a livestreaming content display region and a player interaction display region. The virtual item given by player A and the message left by player A may be viewed. The virtual item transfer record corresponding to player A may be displayed in a lower left region or just above the interface in the form of a ticker.

In addition, to further enhance the playability and livestreaming effect of livestreaming interaction, the processing device may provide players with a plurality of virtual items having special effects. When the virtual items having special effects are transferred between the players, the processing device may display the special effects in the game, thereby giving a richer livestreaming interaction experience to the players.

In the technical solution of this disclosure, the virtual item transfer record may include a game prop and/or a virtual item having a display effect. The display effect is used for displaying in a livestreaming content display region, and/or, displaying at the livestreaming display position. For example, a fireworks effect and a dry ice effect may be displayed at the livestreaming display position, and an explosion effect may be displayed in the livestreaming content display region. The game prop is used for being placed at the livestreaming display position or a designated position other than the livestreaming display position in the game scene. For example, a monster may be placed at the livestreaming display position to interfere with the livestreaming of the livestreamer, or the like.

In an implementation, after receiving a virtual item transfer record transmitted by the server, if the virtual item transfer record includes a virtual item having a display effect, the terminal device may display the display effect in the livestreaming content display region, and/or, display the display effect at the livestreaming display position, so that the players corresponding to the plurality of player objects in the game scene may view the display effect in the game.

Figure 8:
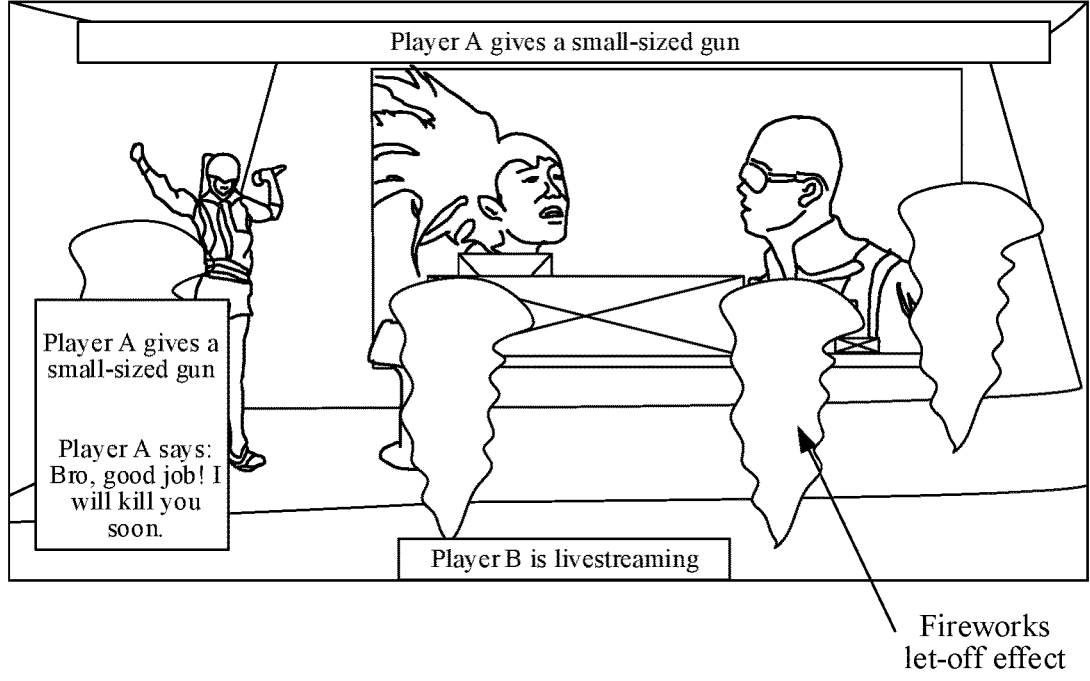
FIG. 8 is a schematic diagram of an interaction method according to an embodiment of this disclosure.

For example, in an actual application scene, the display effect may be a fireworks let-off effect. As shown in FIG. 6, the virtual item displayed by the terminal device includes a small-sized gun and an air dropped treasure box having the fireworks let-off effect. If the terminal device determines that the small-sized gun or the air dropped treasure box exists in the virtual item transfer record, the fireworks let-off effect may be displayed at the livestreaming display position, for example on a virtual stage capable of displaying the livestreaming content, as shown in FIG. 8. Meanwhile, the player may also view the display effect through the livestreaming content displayed at the livestreaming display position.

In another implementation, after receiving a virtual item transfer record transmitted by the server, if the virtual item transfer record includes a game prop, the terminal device may place the game prop at the livestreaming display position or at a designated position in the game scene other than the livestreaming display position to provide an interaction manner for the player to influence in the game scene. By placing the game prop in the game scene, the player can achieve the interaction effects of changing the game environment of other players, affecting the livestreaming content of the player, and the like, thereby bringing a more diversified game scene for the player, allowing the player to experience richer game changes during the game, and improving the willingness of the player to participate in the livestreaming interaction.

For example, in the virtual item shown in FIG. 6, the air dropped treasure box has an effect of dropping a monster. The monster is a game prop in the game. If the player gives the air dropped treasure box to the livestreamer, the terminal device may place the monster on the virtual stage capable of displaying the livestreaming content in the game scene, thereby achieving an effect of bringing a variable game experience for the player object viewing or performing livestreaming on the stage.

It may be understood that in order to properly manage the virtual item in the game and also impart a certain rarity to the virtual item, the player may need to pay a certain virtual value when transferring the virtual item in the game. The virtual value may correspond to a virtual resource or virtual currency for example. The value refers to one or more virtual values in the game. For example, as shown in FIG. 6, the virtual value of the player in the game may be a crystal. 666 crystals, 6666 crystals, and 66666 crystals are needed for virtual items: a plasticine, a small-sized gun, and an air dropped treasure box, respectively, and the player can transfer the virtual items only if the virtual values are enough. Therefore, in an implementation, the processing device may determine whether the player has enough virtual values prior to the transfer of the virtual items.

When desiring to transfer the virtual items, the player may first transmit a virtual item transfer request to the server through the terminal device, and the server may obtain a virtual item transfer request for the livestreamer through a target player identifier. The target player identifier is used for identifying a target player to transfer the virtual items. The virtual item transfer request is used for identifying a target item. The target item is a virtual item to be transferred to the livestreamer by the target player.

Prior to the transfer of the virtual items, the server may first determine whether the target player has enough virtual values to transfer the target virtual item. The server may determine a virtual value corresponding to the target player identifier. The virtual value is a virtual value owned by the target player. The server may transfer the target item to the livestreamer in response to matching the virtual value corresponding to the target player identifier with the virtual value corresponding to the target item, that is, when the target player has enough virtual values to transfer the target item. The virtual value corresponding to the target item refers to a virtual value required for transferring the target item. For example, in the schematic diagram shown in FIG. 6, player A has 50000 crystals and may give 666 crystals of plasticine and 6666 crystals of small-sized gun to the livestreamer, but cannot give 66666 crystals of air dropped treasure box.

For ease of understanding the technical solutions provided in the embodiments of this disclosure, the interaction method in the embodiments of this disclosure is described below with reference to an actual application scene. In the actual application scene, a first terminal device and a second terminal device may be mobile phones running a shooting game. A server may be a game server corresponding to the shooting game. A first object and a second object are both gun-holding characters in the shooting game. A target virtual prop is a livestreaming platform in a game scene.

Figure 10:
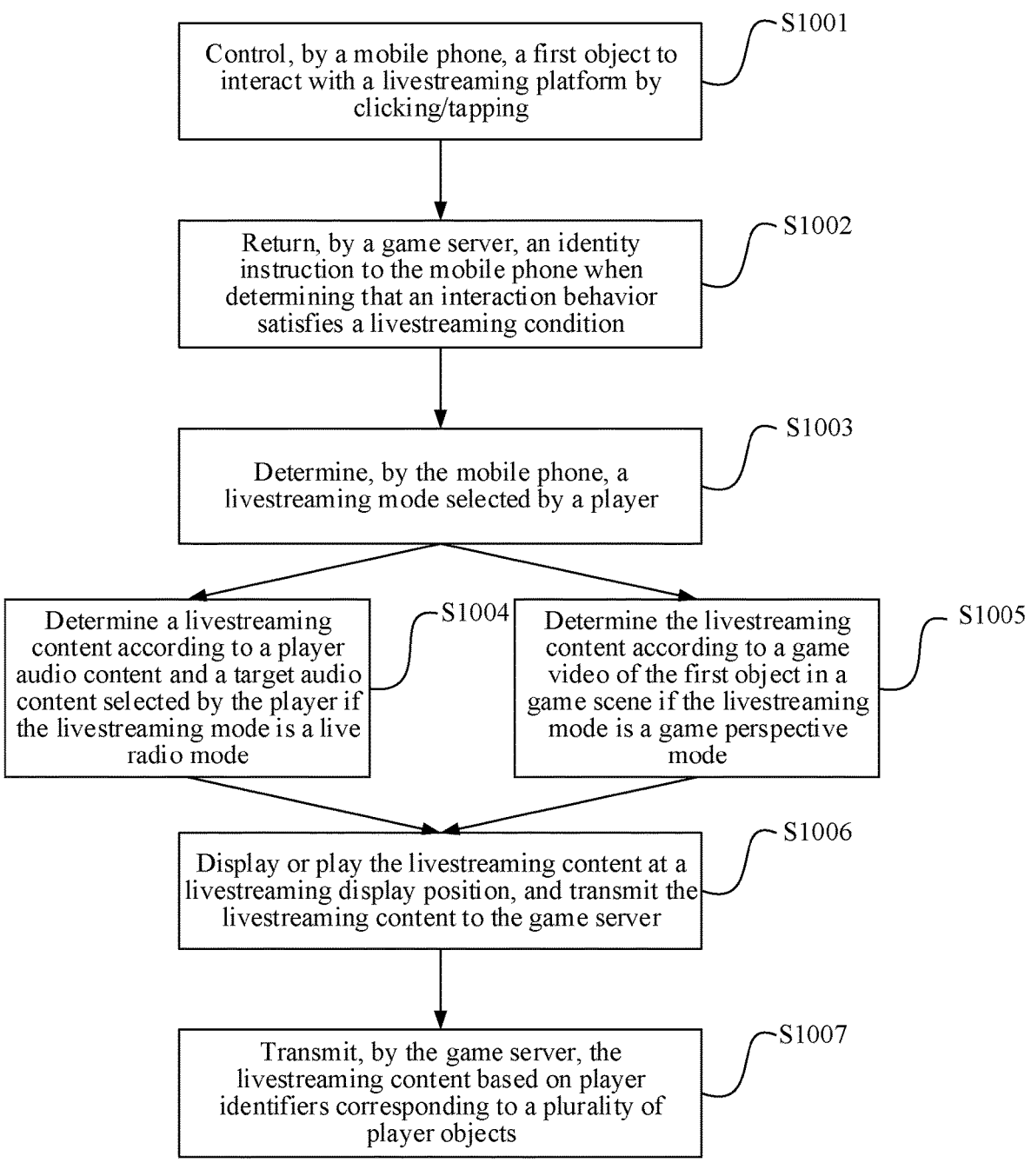
FIG. 10 is a flowchart of an interaction method in an actual application scene according to an embodiment of this disclosure.

FIG. 10 is a flowchart of an interaction method in an actual application scene according to an embodiment of this disclosure. The method includes the following steps:

In step S1001, control, by the mobile phone, the first object to interact with a livestreaming platform.

A player may operate the mobile phone so that the mobile phone may control the first object to move to a stage region in the shooting game scene. The stage region has a livestreaming platform for obtaining a livestreamer identity. The player may control the first object through the mobile phone to interact with the livestreaming platform to obtain the livestreamer identity.

In step S1002, return, by the game server, an identity instruction to the mobile phone when determining that an interaction behavior satisfies a livestreaming condition.

In step S1003, determine, by the mobile phone, a livestreaming mode selected by the player.

After receiving the identity instruction, the mobile phone determines that the first object becomes a livestreamer in the game scene. At this moment, a livestreaming mode selection interface may be displayed for the player, and the player may select a favorite livestreaming mode through the interface to perform livestreaming.

In step S1004, determine a livestreaming content according to a player audio content and a target audio content selected by the player if the livestreaming mode is a live radio mode.

If the livestreaming mode is the live radio mode, the mobile phone may obtain the player audio content through a microphone, determine the target audio content through the displayed audio content selection interface, and determine the livestreaming content according to the content.

In step S1005, determine the livestreaming content according to a game video of the first object in the game scene if the livestreaming mode is a game perspective mode.

If the livestreaming mode is the game perspective mode, the mobile phone may record a game interface corresponding to the first object as the livestreaming content.

In step S1006, display or play the livestreaming content at a livestreaming display position, and transmit the livestreaming content to the game server.

The mobile phone may display or display the livestreaming content on a virtual screen on a stage region in the game scene and on a display apparatus distributed in the game scene, and also transmit the livestreaming content to the server for broadcasting by the server.

In step S1007, transmit, by the game server, the livestreaming content based on player identifiers corresponding to a plurality of player objects.

Figure 11:
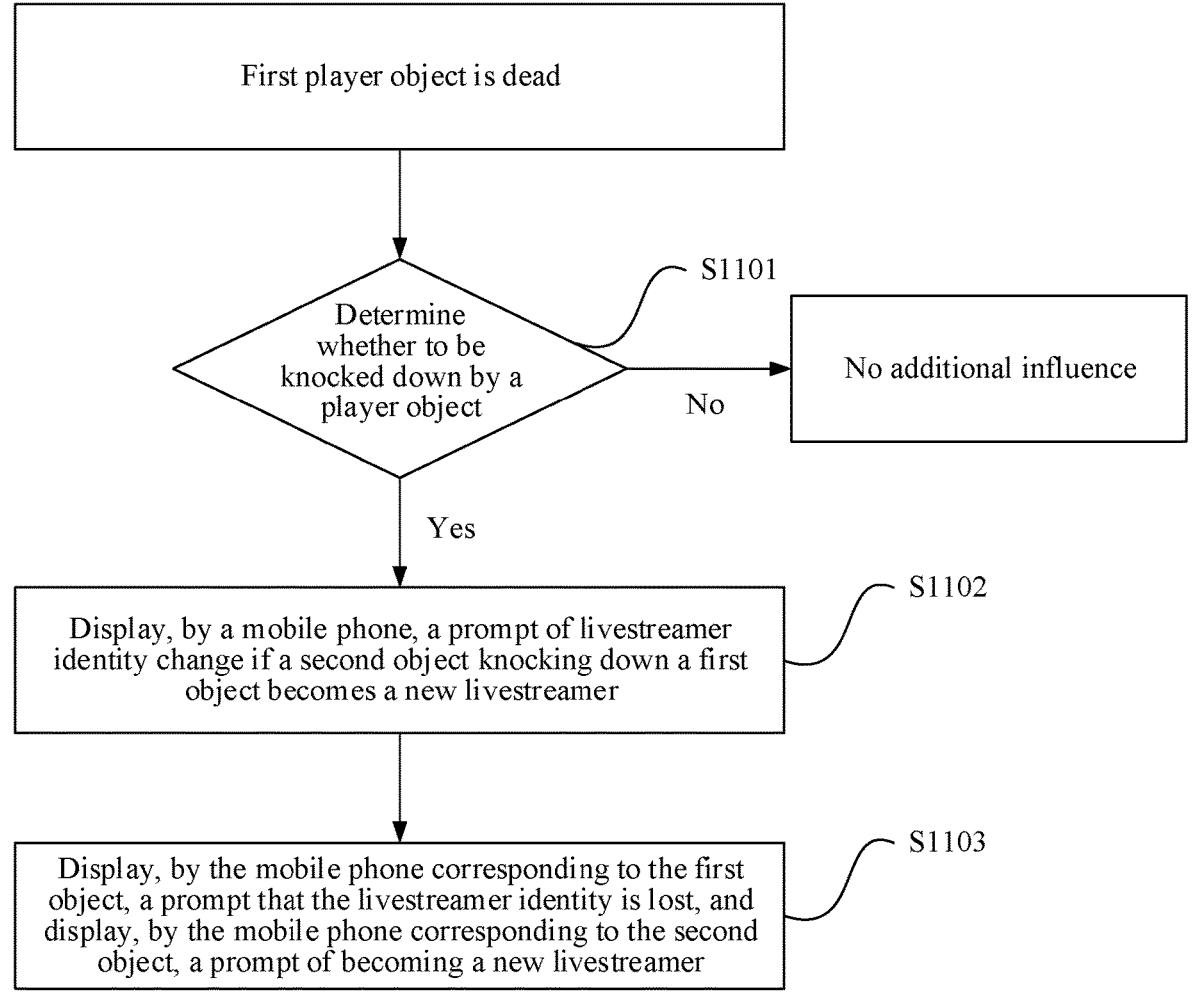
FIG. 11 is a flowchart of livestreamer identity exchange in an actual application scene according to an embodiment of this disclosure.

During the livestreaming performed by the first object as a livestreamer, other players may knock down the first object by controlling the player objects thereof if they desire to compete for the livestreamer identity. FIG. 11 is a flowchart of livestreamer identity exchange in an actual application scene according to an embodiment of this disclosure. The flow includes the following steps:

In step S1101, determine whether the first object is to be knocked down by a player object.

If the server detects that the first object serving as a livestreamer is dead, it may be determined whether the first object is knocked down by the player object. If the first object is not knocked down by the player object, namely the first object committed suicide, for example, falling from a high place, drowning, or the like, an original livestreaming state may be maintained without additional influence. If the first object is knocked down by the player object, S1102 is to be performed.

In step S1102, display, by the mobile phone, a prompt of livestreamer identity change if the second object knocking down the first object becomes a new livestreamer.

If the player controls the second object to knock down the first object, the second object obtains a livestreamer identity. Mobile phones corresponding to a plurality of player objects in the game scene may display a prompt that the livestreamer identity is changed from the first object to the second object.

In step S1103, display, by the mobile phone corresponding to the first object, a prompt that the livestreamer identity is lost, and display, by the mobile phone corresponding to the second object, a prompt of becoming a new livestreamer.

Figure 12:
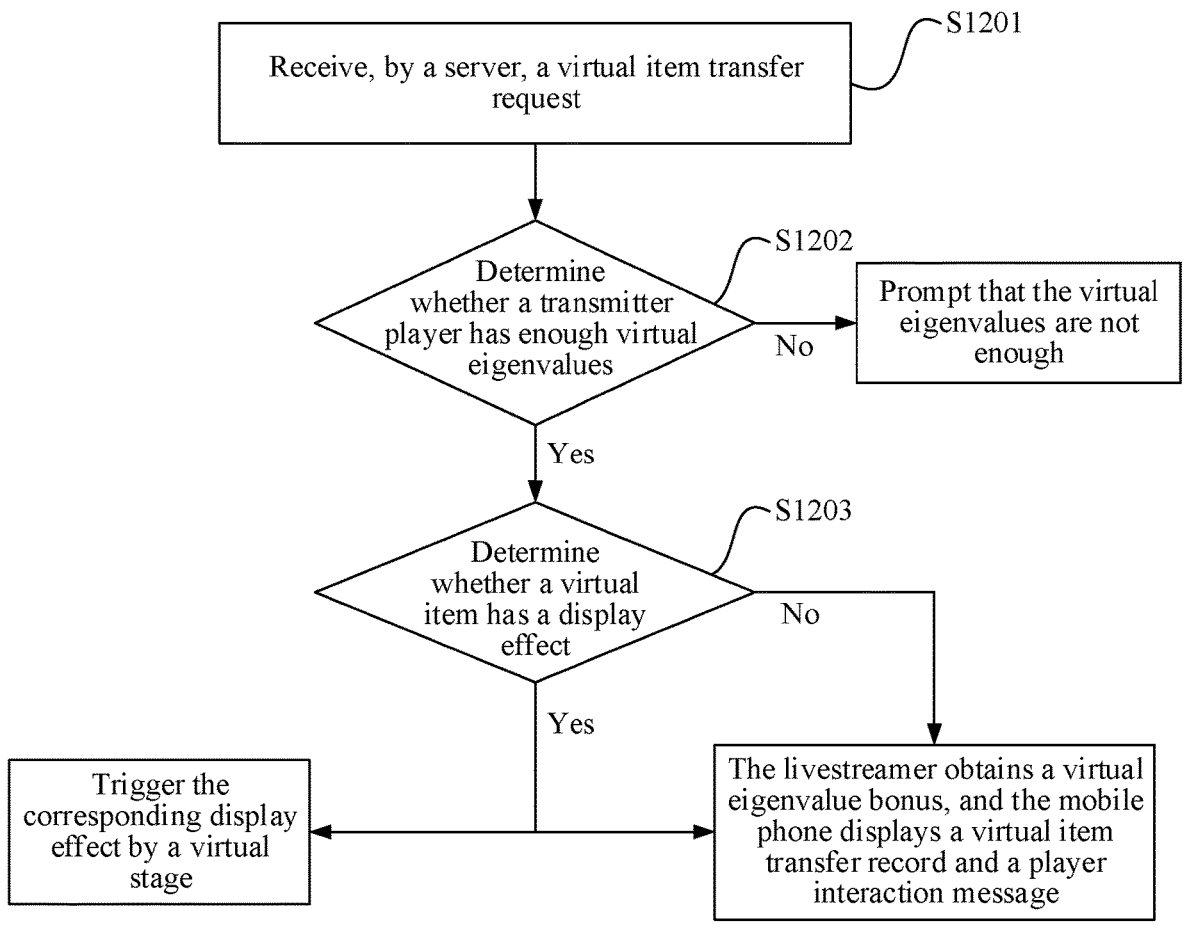
FIG. 12 is a flowchart of virtual item transfer in an actual application scene according to an embodiment of this disclosure.

Meanwhile, during the process of viewing livestreaming, some players may desire to give virtual items to the livestreamer. FIG. 12 is a flowchart of virtual item transfer in an actual application scene according to an embodiment of this disclosure. The flow includes the following steps:

In step S1201, receive, by the server, a virtual item transfer request.

In step S1202, determine whether a transmitter player has enough virtual values.

If the transmitter player does not have enough virtual values, it is prompted that the virtual values of the player are not enough.

In step S1203, determine whether a virtual item has a display effect.

If the transmitter player has enough virtual values, it may be determined that the virtual item has a corresponding display effect. If the virtual item has the corresponding display effect, the display effect may be triggered by the virtual stage. Finally, the livestreamer may obtain a virtual value bonus, and the mobile phone may display a virtual item transfer record and a player interaction message in the form of a ticker.

Figure 13:
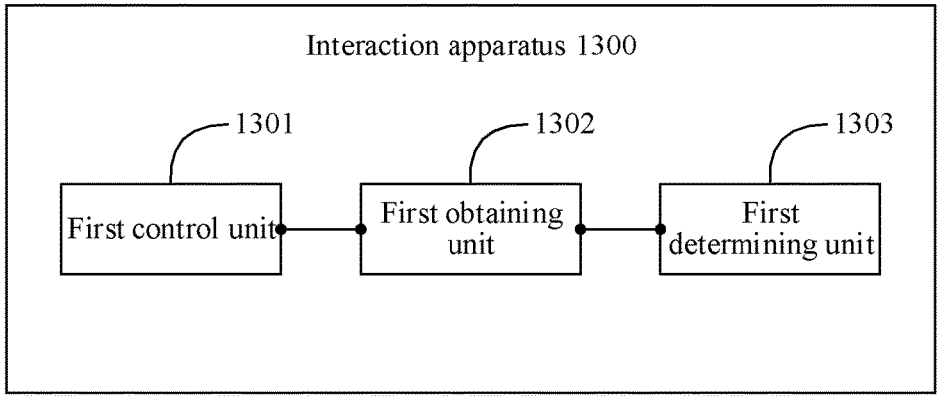
FIG. 13 is a structural block diagram of an interaction apparatus according to an embodiment of this disclosure.

Based on the interaction method provided in the foregoing embodiment, an embodiment of this disclosure further provides an interaction apparatus 300. Referring to FIG. 13, FIG. 13 is a structural block diagram of an interaction apparatus according to an embodiment of this disclosure. The apparatus 1300 includes a first control unit 1301, a first obtaining unit 1302, and a first determining unit 1303. One or more modules, submodules, and/or units of the apparatus can be implemented by processing circuitry, software, or a combination thereof, for example.

The first control unit 1301 is configured to control a first object to perform an interaction behavior for livestreaming in a game scene. The first object is one of a plurality of player objects included in the game scene.

The first obtaining unit 1302 is configured to obtain an identity instruction in response to the interaction behavior satisfying a livestreaming condition. The identity instruction is used for indicating that the first object is a livestreamer in the game scene.

The first determining unit 1303 is configured to determine a livestreaming content livestreamed in the game scene through the first object. The livestreaming content is used for performing livestreaming at a livestreaming display position in the game scene.

In an implementation, the interaction behavior includes a first target behavior for obtaining a livestreaming permission. The first control unit 1301 may be configured to control the first object and a target virtual prop to perform the first target behavior, the target virtual prop being located in a livestreaming permission obtaining region in the game scene.

The operation of obtaining an identity instruction in response to the interaction behavior satisfying a livestreaming condition includes obtaining the identity instruction sent by the server in response to obtaining the livestreaming permission through the first target behavior.

In an implementation, the interaction behavior includes a second target behavior for livestreamer identity exchange. The plurality of player objects further include a second object. The first control unit 1301 may be configured to control the first object to perform the second target behavior with the second object in the game scene, the second object being the livestreamer in the game scene.

The first obtaining unit 1302 may be configured to obtain the identity instruction sent by the server in response to completing the livestreamer identity exchange through the second target behavior.

In an implementation, the apparatus 1300 further includes a first display unit and a second obtaining unit.

The first display unit is configured to display a livestreaming mode selection interface. The livestreaming mode selection interface includes a plurality of livestreaming modes.

The second obtaining unit is configured to obtain a mode selection operation based on the livestreaming mode selection interface. The mode selection operation is used for selecting a target livestreaming mode from the plurality of livestreaming modes.

The first determining unit 1303 may be configured to determine the livestreaming content livestreamed in the game scene through the first object according to the target livestreaming mode.

In an implementation, the target livestreaming mode is a live radio mode. The apparatus 1300 further includes a second display unit and a third obtaining unit.

The second display unit is configured to display an audio content selection interface. The audio content selection interface includes a plurality of audio contents.

The third obtaining unit is configured to obtain an audio selection operation based on the audio content selection interface. The audio selection operation is used for selecting a target audio content from the plurality of audio contents.

The first determining unit 1303 may be configured to determine the livestreaming content livestreamed in the game scene through the target audio content and a player audio content determined by the first object.

In an implementation, the target livestreaming mode is a game perspective mode. The first determining unit 1303 may be configured to determine a livestreaming content livestreamed in the game scene according to a game video of the first object in the game scene.

In an implementation, the apparatus 1300 further includes a second determining unit and a livestreaming unit.

The second determining unit is configured to determine an object position of the first object in the game scene.

The livestreaming unit is configured to display or play the livestreaming content through the livestreaming display position according to a positional relationship between the object position and the livestreaming display position in the game scene.

In an implementation, the apparatus 1300 further includes a viewing unit and a third display unit.

The viewing unit is configured to perform a viewing operation on a display apparatus at the livestreaming display position through the first object.

The third display unit is configured to display a livestreaming content viewing interface. The livestreaming content viewing interface includes a player interaction display region and a livestreaming content display region. The player interaction display region is used for displaying a player interaction message and a virtual item transfer record.

In an implementation, if the virtual item transfer record includes a virtual item having a display effect, the apparatus 1300 further includes a fourth display unit.

The fourth display unit is configured to display the display effect in the livestreaming content display region, and/or, display the display effect at the livestreaming display position.

In an implementation, if the virtual item transfer record includes a game prop, the apparatus 1300 further includes a placement unit.

The placement unit is configured to place the game prop at the livestreaming display position or a designated position other than the livestreaming display position in the game scene.

In an implementation, the apparatus 1300 further includes a fifth display unit.

The fifth display unit is configured to display a prompt prompting the first object to obtain a livestreamer identity.

In an implementation, the livestreaming content may be used for performing livestreaming for the plurality of player objects at the livestreaming display position in the game scene; or performing livestreaming in a livestreaming platform based on the livestreaming display position in the game scene.

Figures 14, 15:
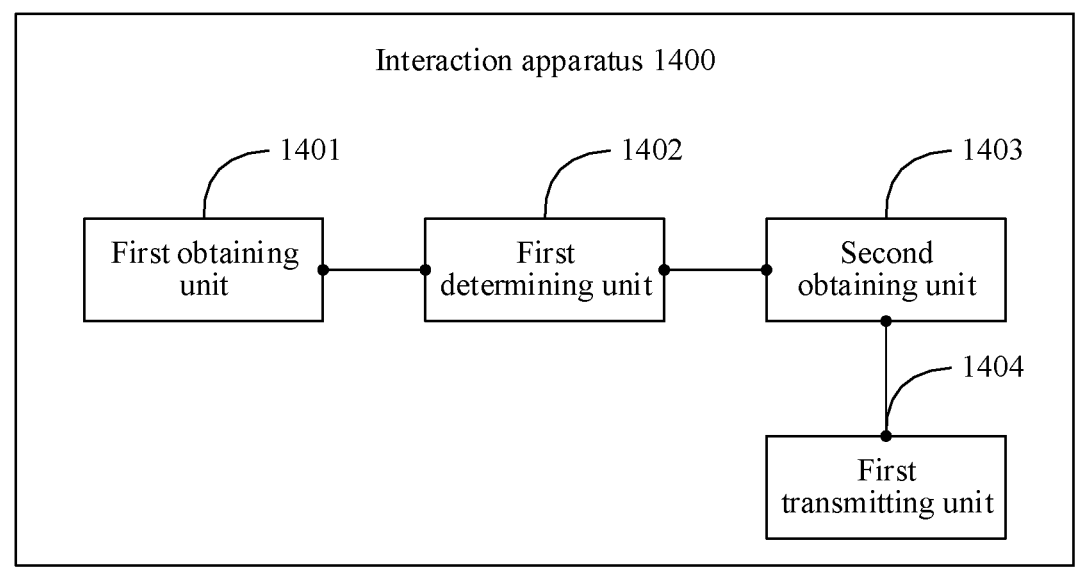
FIG. 14 is a structural block diagram of an interaction apparatus according to an embodiment of this disclosure.
FIG. 15 is a structural diagram of a computer device according to an embodiment of this disclosure.

Based on the interaction method provided in the foregoing embodiment, an embodiment of this disclosure further provides an interaction apparatus 1400. Referring to FIG. 14, FIG. 14 is a structural block diagram of an interaction apparatus according to an embodiment of this disclosure. The apparatus 1400 includes a first obtaining unit 1401, a first determining unit 1402, a second obtaining unit 1403, and a first transmitting unit 1404. One or more modules, submodules, and/or units of the apparatus can be implemented by processing circuitry, software, or a combination thereof, for example.

The first obtaining unit 1401 is configured to obtain an interaction behavior performed by a first object in a game scene. The first object is one of a plurality of player objects included in the game scene.

The first determining unit 1402 is configured to determine that the first object is a livestreamer in the game scene in response to the interaction behavior satisfying a livestreaming condition, and return an identity instruction based on a player identifier corresponding to the first object. The identity instruction is used for indicating that the first object is the livestreamer.

The second obtaining unit 1403 is configured to obtain a livestreaming content based on the player identifier corresponding to the first object. The livestreaming content is determined through the first object, and the livestreaming content is used for performing livestreaming for the plurality of player objects at a livestreaming display position in the game scene.

The first transmitting unit 1404 is configured to transmit the livestreaming content according to player identifiers respectively corresponding to the plurality of player objects.

In an implementation, the apparatus 1400 further includes a third obtaining unit and a second transmitting unit.

The third obtaining unit is configured to obtain an interaction information display request initiated for the livestreaming content. The interaction information display request includes interaction information. The interaction information includes at least one of a player interaction message and a virtual item transfer record.

The second transmitting unit is configured to transmit the interaction information according to player identifiers respectively corresponding to the plurality of player objects. The interaction information is used for being displayed in a player interaction display region corresponding to the livestreaming content.

In an implementation, the virtual item transfer record includes a game prop and/or a virtual item having a display effect. The display effect is used for displaying in a livestreaming content display region, and/or, displaying at the livestreaming display position. The game prop is used for being placed at the livestreaming display position or a designated position other than the livestreaming display position in the game scene.

In an implementation, the apparatus 1400 further includes a fourth obtaining unit and a transfer unit.

The fourth obtaining unit is configured to obtain a virtual item transfer request for the livestreamer through a target player identifier. The virtual item transfer request is used for identifying a target item.

The transfer unit is configured to transfer the target item to the livestreamer in response to matching a virtual value corresponding to the target player identifier with a virtual value corresponding to the target item.

In an implementation, the apparatus 1400 further includes a third transmitting unit.

The third transmitting unit is configured to transmit an identity prompt according to player identifiers respectively corresponding to the plurality of player objects in response to the interaction behavior satisfying a livestreaming condition. The identity prompt is used for prompting the first object to obtain the livestreamer identity.

In an implementation, the plurality of player objects include a target object. The apparatus 1400 further includes a second determining unit.

The second determining unit is configured to determine a game picture corresponding to the target object according to the target object and the livestreaming content.

The first transmitting unit 1404 may be configured to transmit game pictures respectively corresponding to the plurality of player objects according to player identifiers respectively corresponding to the plurality of player objects.

In an implementation, the plurality of player objects include a second object. The second object is the livestreamer in the game scene. The first determining unit 1402 may be configured to convert the livestreamer in the game scene from the second object to the first object in response to completing the livestreamer identity exchange through the interaction behavior.

The apparatus 1400 further includes a termination unit. The termination unit is configured to terminate the operation of obtaining the livestreaming content based on the player identifier corresponding to the second object.

Figure 19:
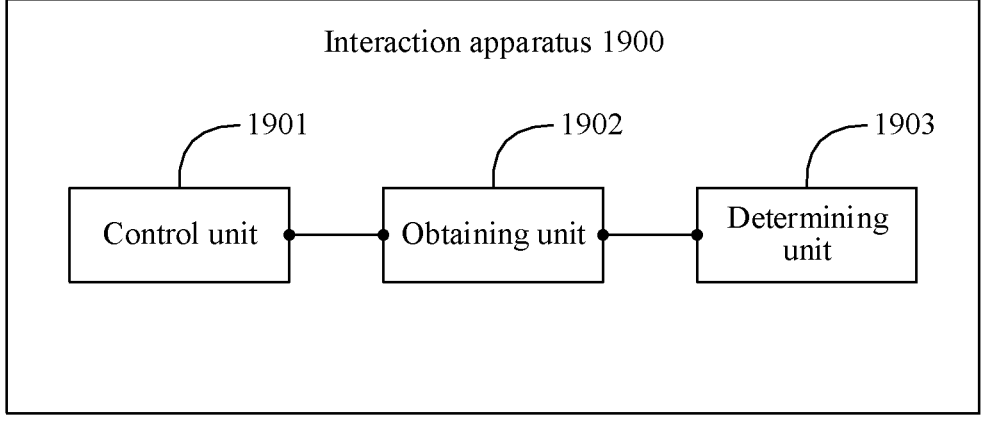
FIG. 19 is a structural block diagram of an interaction apparatus according to an embodiment of this disclosure.

Based on the interaction method provided in the foregoing embodiment, an embodiment of this disclosure further provides an interaction apparatus. Referring to FIG. 19, FIG. 19 is a structural block diagram of an interaction apparatus 1900 according to an embodiment of this disclosure. The apparatus 1900 includes a control unit 1901, an obtaining unit 1902, and a determining unit 1903. One or more modules, submodules, and/or units of the apparatus can be implemented by processing circuitry, software, or a combination thereof, for example.

The control unit 1901 is configured to control a first object to perform an interaction behavior for a second object in a game scene. The second object is a livestreamer in the game scene.

The obtaining unit 1902 is configured to obtain an identity instruction in response to the interaction behavior satisfying a livestreaming condition. The identity instruction is used for indicating that the livestreamer in the game scene is converted from the second object to the first object.

The determining unit 1903 is configured to determine a livestreaming content livestreamed in the game scene through the first object. The livestreaming content is used for performing livestreaming at a livestreaming display position in the game scene.

Figure 20:
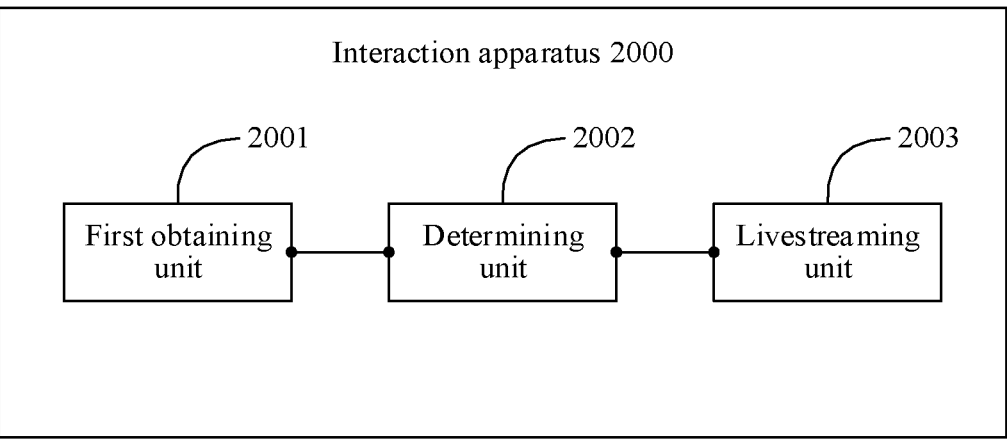
FIG. 20 is a structural block diagram of an interaction apparatus according to an embodiment of this disclosure.

Based on the interaction method provided in the foregoing embodiment, an embodiment of this disclosure further provides an interaction apparatus. FIG. 20 is a structural block diagram of an interaction apparatus 2000 according to an embodiment of this disclosure. The apparatus 2000 includes a first obtaining unit 2001, a determining unit 2002, and a livestreaming unit 2003. One or more modules, submodules, and/or units of the apparatus can be implemented by processing circuitry, software, or a combination thereof, for example.

The first obtaining unit 2001 is configured to obtain a livestreaming content generated based on a first object. The first object is a livestreamer in a game scene, and a plurality of player objects in the game scene include the first object and a third object.

The determining unit 2002 is configured to determine a livestreaming display position in the game scene.

The livestreaming unit 2003 is configured to livestream the livestreaming content for the third object at the livestreaming display position according to a positional relationship between an object position of the third object and the livestreaming display position in the game scene.

In an implementation, the apparatus 2000 further includes a first display unit, a second obtaining unit, and a second display unit.

The first display unit is configured to display an interaction message input interface for the livestreaming content.

The second obtaining unit is configured to obtain a message input operation based on the interaction message input interface. The message input operation is used for inputting a player interaction message for the livestreaming content.

The second display unit is configured to display the player interaction message in a player interaction display region corresponding to the livestreaming content.

In an implementation, the apparatus 2000 further includes a third display unit, a third obtaining unit, and a fourth display unit.

The third display unit is configured to display a virtual item transfer interface for the livestreaming content. The virtual item transfer interface includes a plurality of virtual items.

The third obtaining unit is configured to obtain an item selection operation based on the virtual item transfer interface. The item selection operation is used for selecting a target virtual item from the plurality of virtual items.

The fourth display unit is configured to display a virtual item transfer record corresponding to the target virtual item in a player interaction display region corresponding to the livestreaming content.

An embodiment of this disclosure further provides an interaction system. The system includes a first terminal device, a second terminal device, and a server. The system may be configured to perform the interaction method provided in any one of the foregoing embodiments. The first terminal device is a terminal device corresponding to a player object for obtaining a livestreamer identity, and is configured to perform the foregoing interaction methods for obtaining the livestreamer identity, determining a livestreaming content, and the like. The second terminal device is a terminal device corresponding to a player object serving as a viewer, and may perform the foregoing interaction methods for livestreaming for a third object, determining a user interaction content, and the like. The server may be configured to perform one or more of the interaction methods.

An embodiment of this disclosure further provides a computer device. The device will now be described with reference to the accompanying drawings. Referring to FIG. 15, this embodiment of this disclosure provides a device. The device may be a terminal device. The terminal device may be any intelligent terminal including a mobile phone, a tablet computer, a personal digital assistant (PDA), a point of sales (POS), and an on-board computer. The terminal device being a mobile phone is used as an example.

FIG. 15 shows a block diagram of a structure of a part of a mobile phone related to a terminal device according to an embodiment of this disclosure. Referring to FIG. 15, the mobile phone includes: a radio frequency (RF) circuit 710, a memory 720, an input unit 730, a display unit 740, a sensor 750, an audio circuit 760, a WiFi module 770, a processor 780, a power supply 790, and other components. The structure of the mobile phone shown in FIG. 15 does not constitute a limitation on the mobile phone, and the mobile phone may include more components or fewer components than those shown in the figure, or some components may be combined, or a different component deployment may be used.

The following provides a more detailed description of the various components of the mobile phone with reference to FIG. 15.

Communication or receiver circuitry, such as the RF circuit 710, may be configured to receive and transmit signals during an information receiving and transmitting process or a call process. In an example, downlink information from a base station is received and then delivered to the processor 780 for processing. In addition, designed uplink data is transmitted to the base station. Usually, the RF circuit 710 includes, but is not limited to, an antenna, at least one amplifier, a transceiver, a coupler, a low noise amplifier (LNA), a duplexer, and the like. In addition, the RF circuit 710 may also communicate with a network and another device by wireless communication. The wireless communication may use any communication standard or protocol, which includes, but is not limited to, global system for mobile communications (GSM), general packet radio service (GPRS), code division multiple access (CDMA), wideband code division multiple access (WCDMA), long term evolution (LTE), e-mail, short messaging service (SMS), and the like.

The memory 720 may be configured to store a software program and module. Processing circuitry, such as the processor 780, runs the software program and module stored in the memory 720, to implement various functional applications and data processing of the mobile phone. The memory 720 may mainly include a program storage region and a data storage region. The program storage region may store an operating system, an application required by at least one function (for example, a sound playing function and an image playing function), or the like. The data storage region may store data (for example, audio data and a phone book) created according to use of the mobile phone. In addition, the memory 720 may include a high speed random access memory, and may also include a non-volatile memory, such as at least one magnetic disk storage device, a flash memory, or another volatile solid-state storage device.

The input unit 730 may be configured to receive input digit or character information, and generate a keyboard signal input related to the user setting and function control of the mobile phone. Specifically, the input unit 730 may include a touch panel 731 and another input device 732. The touch panel 731, which may also be referred to as a touch screen, may collect a touch operation of a user on or near the touch panel (such as an operation of a user on the touch panel 731 or near the touch panel 731 by using any suitable object or accessory such as a finger or a stylus), and drive a corresponding connection apparatus according to a preset program. Optionally, the touch panel 731 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and transmits the touch point coordinates to the processor 780. Moreover, the touch controller can receive and execute a command transmitted from the processor 780. In addition, the touch panel 731 may be implemented by using various types, such as a resistive type, a capacitance type, an infrared type, and a surface sound wave type. In addition to the touch panel 731, the input unit 730 may further include the another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. Optionally, the display panel 741 may be configured by using a liquid crystal display (LCD), an organic light-emitting diode (OLED), or the like. Further, the touch panel 731 may cover the display panel 741. After detecting a touch operation on or near the touch panel, the touch panel 731 transfers the touch operation to the processor 780, so as to determine a type of a touch event. Then, the processor 780 provides corresponding visual output on the display panel 741 according to the type of the touch event. Although in FIG. 15, the touch panel 731 and the display panel 741 are used as two separate parts to implement input and output functions of the mobile phone, in some embodiments, the touch panel 731 and the display panel 741 may be integrated to implement the input and output functions of the mobile phone.

The mobile phone may further include at least one sensor 750 such as an optical sensor, a motion sensor, and other sensors. Specifically, the optical sensor may include an ambient light sensor and a proximity sensor. The ambient light sensor may adjust luminance of the display panel 741 according to the luminance of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the mobile phone, are not further described herein.

The audio circuit 760, a loudspeaker 761, and a microphone 762 may provide audio interfaces between the user and the mobile phone. The audio circuit 760 may convert received audio data into an electric signal and transmit the electric signal to the loudspeaker 761. The loudspeaker 761 converts the electric signal into a sound signal and output the sound signal. In another aspect, the microphone 762 converts a collected sound signal into an electric signal. The audio circuit 760 receives the electric signal, converts the electric signal into audio data, and outputs the audio data to the processor 780 for processing. Then, the audio data is transmitted to another mobile terminal by using the RF circuit 710, or the audio data is outputted to the memory 720 for further processing.

WiFi belongs to a short distance wireless transmission technology. The mobile phone may help, by using the WiFi module 770, a user to receive and send an email, browse a web page, access stream media, and the like. This provides wireless broadband Internet access for the user. Although FIG. 15 shows the WiFi module 770, it may be understood that the WiFi module is not a necessary component of the mobile phone, and the WiFi module may be omitted as required provided that the scope of the essence of the present disclosure is not changed.

The processor 780 is a control center of the mobile phone, and is connected to various parts of the entire mobile phone by using various interfaces and lines. By running or executing a software program and/or module stored in the memory 720, and invoking data stored in the memory 720, the processor executes various functions of the mobile phone and performs data processing, thereby monitoring the entire mobile phone. Optionally, the processor 780 may include one or more processing units. Preferably, the processor 780 may integrate an application processor and a modem. The application processor mainly processes an operating system, a user interface, an application, and the like. The modem mainly processes wireless communication. It may be understood that the foregoing modem may either not be integrated into the processor 780.

The mobile phone further includes the power supply 790 (such as a battery) for supplying power to the components. Preferably, the power supply may be logically connected to the processor 780 by using a power supply management system, to implement a function of managing charge, discharge, power consumption, and the like by using the power supply management system.

Although not shown in the figure, the mobile phone may further include a camera, a Bluetooth module, and the like, which are not further described herein.

In this embodiment, the processor 780 included in the terminal device also has the following function:

controlling a first object to perform an interaction behavior for livestreaming in a game scene, the first object being one of a plurality of player objects included in the game scene;

obtaining an identity instruction in response to the interaction behavior satisfying a livestreaming condition, the identity instruction being used for indicating that the first object is a livestreamer in the game scene; and determining a livestreaming content livestreamed in the game scene, the livestreaming content being used for performing livestreaming at a livestreaming display position in the game scene;

or controlling a first object to perform an interaction behavior for a second object in a game scene, the second object being a livestreamer in the game scene;

obtaining an identity instruction in response to the interaction behavior satisfying a livestreaming condition, the identity instruction being used for indicating that the livestreamer in the game scene is converted from the second object to the first object; and determining a livestreaming content livestreamed in the game scene, the livestreaming content being used for performing livestreaming at a livestreaming display position in the game scene;

or obtaining a livestreaming content generated based on a first object, the first object being a livestreamer in a game scene, and the game scene including the first object and a third object;

determining a livestreaming display position in the game scene; and performing livestreaming for the third object at the livestreaming display position according to the livestreaming content.

Figure 16:
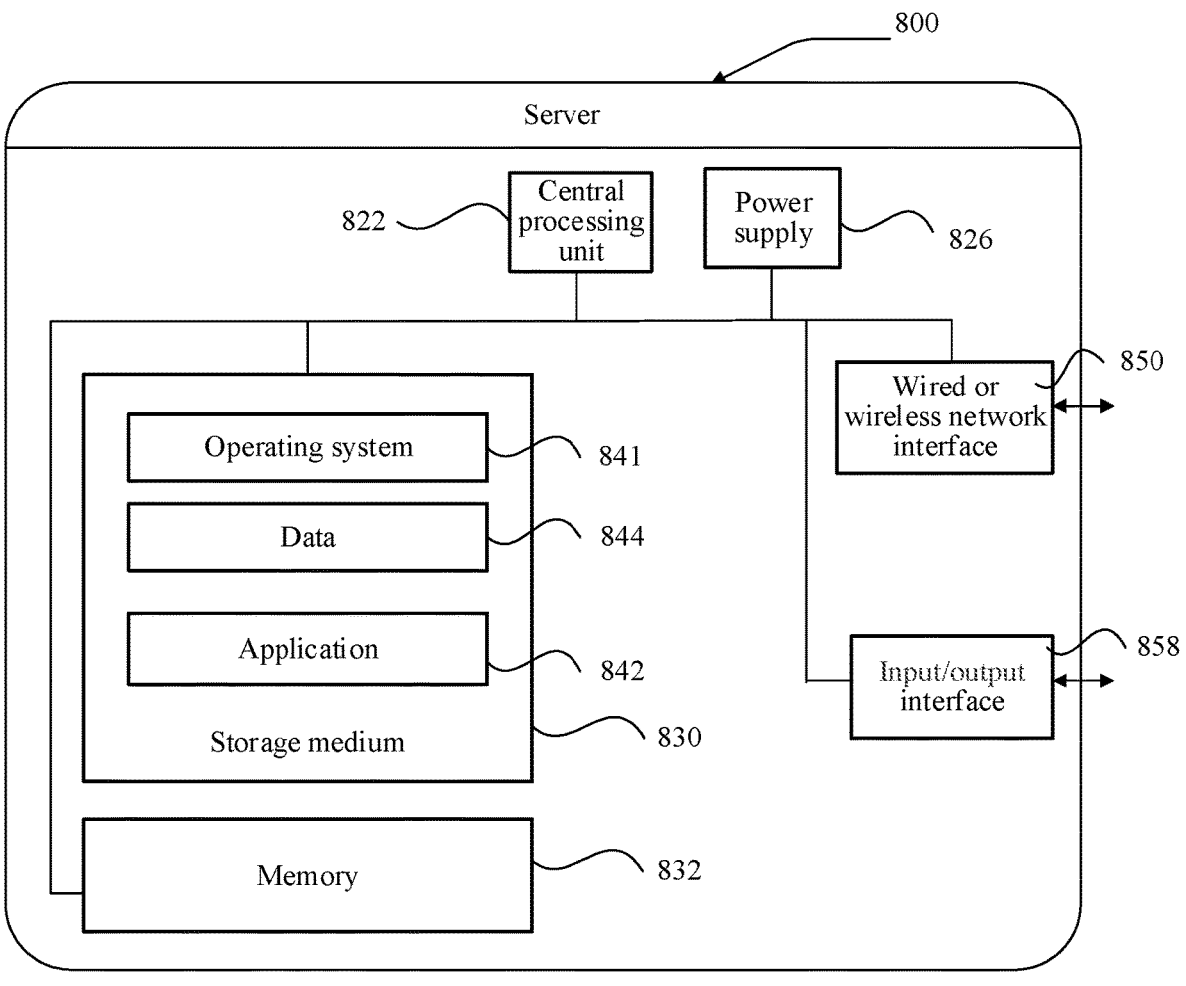
FIG. 16 is a structural diagram of a server according to an embodiment of this disclosure.

An embodiment of this disclosure further provides a server. FIG. 16 is a structural diagram of a server 800 according to an embodiment of this disclosure. The server 800 greatly differs due to different configurations or performances. The server may include processing circuitry, such as one or more central processing units (CPU) 822 (for example, one or more processors), a memory 832, and one or more storage media 830 for storing applications 842 or data 844 (for example, one or more mass storage devices). The memory 832 and the storage medium 830 may be configured for transient storage or permanent storage. A program stored in the storage medium 830 may include one or more modules (which are not marked in the figure), and each module may include a series of instruction operations on the server. Furthermore, the central processing unit 822 may be configured to communicate with the storage medium 830, and perform, on the server 800, the series of instruction operations in the storage medium 830.

The server 800 may further include one or more power supplies 826, one or more wired or wireless network interfaces 850, one or more input/output interfaces 858, and/or one or more operating systems 841 such as Windows Server™, Mac OS X™, Unix™, Linux™, or FreeBSD™.

The steps performed by the server in the foregoing embodiment may be based on the server structure shown in FIG. 16.

For example, the server may execute the following function:

obtaining an interaction behavior performed by a first object in a game scene, the first object being one of a plurality of player objects included in the game scene;

determining that the first object is a livestreamer in the game scene in response to the interaction behavior satisfying a livestreaming condition, and returning an identity instruction based on a player identifier corresponding to the first object, the identity instruction being used for indicating that the first object is the livestreamer;

obtaining a livestreaming content based on the player identifier corresponding to the first object, the livestreaming content being used for performing livestreaming for the plurality of player objects at a livestreaming display position in the game scene; and transmitting the livestreaming content according to player identifiers respectively corresponding to the plurality of player objects.

An embodiment of this disclosure further provides a computer-readable storage medium, such as a non-transitory computer-readable storage medium, for storing a computer program. The compute program is used for performing any implementation in the interaction method in the foregoing embodiments.

An embodiment of this disclosure further provides a computer program product including instructions that, when run on a computer, enable the computer to perform the method provided in the foregoing embodiments.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

All or some steps for implementing the foregoing method embodiments may be completed by a program instructing related hardware, the foregoing program may be stored in a computer-readable storage medium, and the program, when executed, performs steps including the foregoing method embodiments. The foregoing storage medium may be at least one of the following media: a read-only memory (ROM), a RAM, a magnetic disk or an optical disc, and various media capable of storing program codes.

The embodiments of this disclosure are all described in a progressive manner, the same or similar parts in the embodiments may be referred to each other, and descriptions of each embodiment focus on a difference from other embodiments. Especially, device and system embodiments are basically similar to the method embodiments, and therefore are described briefly. For related parts, reference may be made to the exemplary descriptions in the method embodiments. The described device and system embodiments are merely exemplary. The units described as separate parts may or may not be physically separated, and parts displayed as units may or may not be physical units, may be located in one position, or may be distributed on a plurality of network units. Some or all of the modules may be selected according to actual needs to achieve the objectives of the solutions of this embodiment.

The foregoing descriptions are merely exemplary implementations of this disclosure, which are not intended to limit the scope of this disclosure. Other embodiments shall fall within the scope of this disclosure.

What is claimed is:

1. An interaction method, comprising:
controlling a first virtual object to perform an action in a virtual environment based on a user input of a user;
receiving livestreaming permission information based on the action satisfying a livestreaming condition, the livestreaming permission information indicating that the first virtual object is permitted to livestream in the virtual environment;
determining livestreaming content to live stream in the virtual environment based on the livestreaming content being selected by the user that controls the first virtual object; and
outputting for display the livestreaming content to a virtual screen in the virtual environment.

2. The interaction method according to claim 1, wherein the determining the livestreaming content to live stream comprises:
determining the livestreaming content to live stream at a predefined position in the virtual environment.

3. The interaction method according to claim 1, wherein the determining the livestreaming content to live stream comprises:
determining the livestreaming content to live stream to a display object in the virtual environment.

4. The interaction method according to claim 1, wherein the controlling the first virtual object includes controlling the first virtual object to perform the action in a predetermined region of the virtual environment, and the action corresponds to a livestreaming request.

5. The interaction method according to claim 4, wherein the predetermined region of the virtual environment corresponds to a virtual stage in the virtual environment.

6. The interaction method according to claim 1, wherein
the action is performed on a second virtual object that has permission to live stream in the virtual environment,
the livestreaming condition is satisfied when the action performed on the second virtual object causes a predefined change in an attribute value of the second virtual object, and
the permission to livestream in the virtual environment switches from the second virtual object to the first virtual object when the action performed on the second virtual object satisfies the livestreaming condition.

7. The interaction method according to claim 1, further comprising:
displaying a livestreaming mode selection interface, the livestreaming mode selection interface being configured to receive a user selection of a target livestreaming mode from a plurality of livestreaming modes; and
receiving the user selection of the target livestreaming mode from the plurality of livestreaming modes via the livestreaming mode selection interface,
wherein the determining the livestreaming content to live stream includes determining the livestreaming content to live stream in the virtual environment according to the target livestreaming mode.

8. The interaction method according to claim 7, wherein the target livestreaming mode is a live radio mode, and the method further comprises:
displaying an audio content selection interface, the audio content selection interface being configured to receive a user selection of a target audio content from a plurality of audio contents; and
receiving the user selection of the target audio content via the audio content selection interface, and
the determining the livestreaming content to live stream includes determining the livestreaming content to live stream based on the target audio content and user audio content.

9. The method according to claim 7, wherein
the target livestreaming mode is a game perspective mode, and
the determining the livestreaming content to live stream includes determining the livestreaming content to live stream based on a game video of the first virtual object in the virtual environment.

10. An interaction method, comprising:
determining an action that is performed by a first virtual object in a virtual environment based on a user input of a user;
determining that the first virtual object is permitted to live stream in the virtual environment when the action satisfies a livestreaming condition;
obtaining livestreaming content of the first virtual object that is output to a virtual screen in the virtual environment based on the livestreaming content being selected by the user that controls the first virtual object; and transmitting the livestreaming content to a terminal device of a second virtual object in the virtual environment.

11. The interaction method according to claim 10, wherein the livestreaming content is displayed at a predefined position in the virtual environment.

12. The interaction method according to claim 10, wherein the livestreaming content is displayed by a display object in the virtual environment.

13. The interaction method according to claim 10, wherein the action is performed by the first virtual object in a predetermined region of the virtual environment, and the action corresponds to a livestreaming request.

14. The interaction method according to claim 10, wherein the action is performed on the second virtual object that has permission to live stream in the virtual environment, the livestreaming condition is satisfied when the action performed on the second virtual object causes a predefined change in an attribute value of the second virtual object, and the permission to livestream in the virtual environment switches from the second virtual object to the first virtual object when the action performed on the second virtual object satisfies the livestreaming condition.

15. A non-transitory computer readable storage medium storing instructions which when executed by at least one processor cause the at least one processor to perform:

controlling a first virtual object to perform an action in a virtual environment based on a user input of a user;

receiving livestreaming permission information based on the action satisfying a livestreaming condition, the livestreaming permission information indicating that the first virtual object is permitted to livestream in the virtual environment;

determining livestreaming content to live stream in the virtual environment based on the livestreaming content being selected by the user that controls the first virtual object; and outputting for display the livestreaming content to a virtual screen in the virtual environment.

* * * * *